United States Patent
Li et al.

(10) Patent No.: US 12,000,988 B2
(45) Date of Patent: Jun. 4, 2024

(54) CAMERA LENS GROUP

(71) Applicant: Zhejiang Sunny Optics Co., Ltd, Yuyao (CN)

(72) Inventors: Yanping Li, Yuyao (CN); Lingbo He, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 656 days.

(21) Appl. No.: 17/203,419

(22) Filed: Mar. 16, 2021

(65) Prior Publication Data

US 2021/0389574 A1 Dec. 16, 2021

(30) Foreign Application Priority Data

Jun. 11, 2020 (CN) .......................... 202010529589.X

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC ... G02B 13/0045; G02B 9/64; G02B 27/0025
USPC ......................................................... 359/714
See application file for complete search history.

(56) References Cited

FOREIGN PATENT DOCUMENTS

| CN | 109870788 A | 6/2019 |
| CN | 110554485 A | 12/2019 |
| CN | 210626762 U | 5/2020 |

OTHER PUBLICATIONS

First Examination Report for Application 202114013644, dated Feb. 8, 2022, 6 pages.

*Primary Examiner* — Joseph P Martinez
*Assistant Examiner* — Grant A Gagnon
(74) *Attorney, Agent, or Firm* — Barnes & Thornburg LLP

(57) ABSTRACT

The present disclosure discloses a camera lens group including, sequentially from an object side to an image side along an optical axis, a first lens, a second lens, a third lens, a fourth lens, a fifth lens, a sixth lens, a seventh lens, an eighth lens, a ninth lens and a tenth lens. Each of the first lens to the tenth lens has refractive power. Half of a diagonal length ImgH of an effective pixel area on an imaging plane of the camera lens group satisfies: ImgH≥6.00 mm.

19 Claims, 11 Drawing Sheets

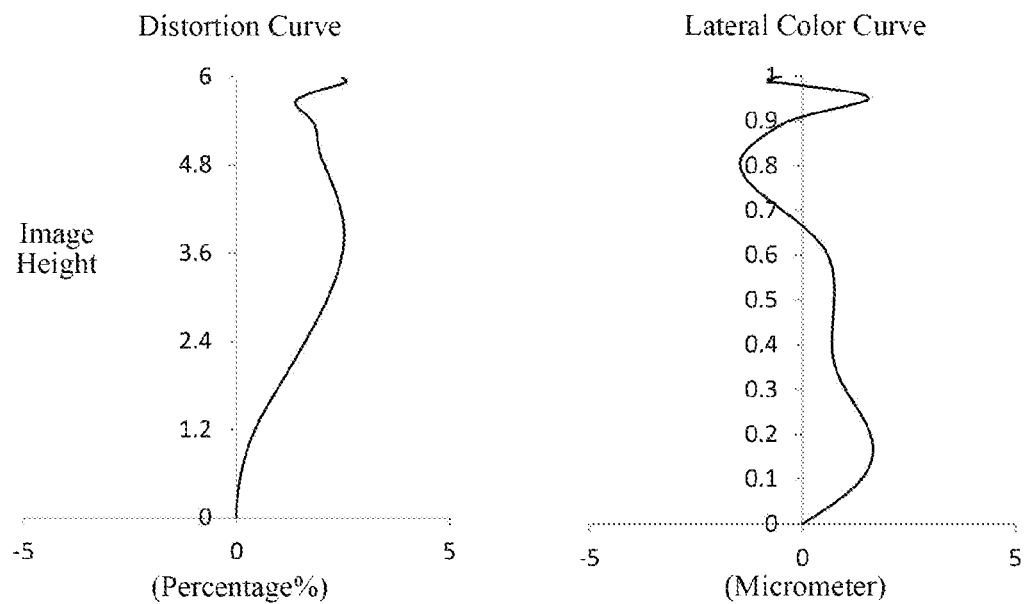
Fig. 10C
Fig. 10D
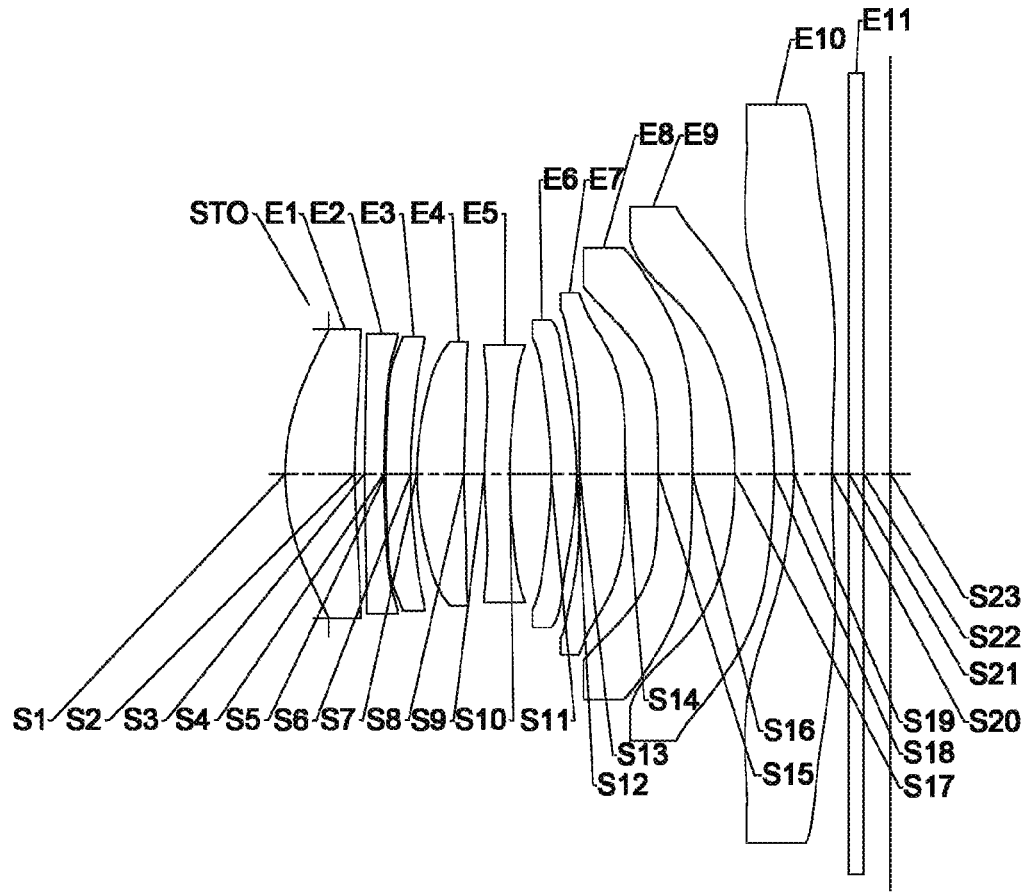
Fig. 11

CAMERA LENS GROUP

CROSS-REFERENCE TO RELATED APPLICATION

This application claims benefit of priority to Chinese Patent Application No. 202010529589.X filed on Jun. 11, 2020 before the China National Intellectual Property Administration, the entire disclosure of which is incorporated herein by reference in its entity.

TECHNICAL FIELD

The present disclosure relates to the field of optical elements, and specifically, relates to a camera lens group.

BACKGROUND

From the single-camera lens assembly a few years ago to the multi-camera combination lens assembly nowadays to the digging front lens pursued by major manufacturers today, the camera function of mobile phones will bring new developments every time, and every advancement may bring users a more pleasant experience. The main camera lens assembly is one of the key members of the multi-camera combination lens assembly. Due to the high pixels of the main camera lens assembly, the main camera lens assembly is responsible for shooting the overall picture, and it has become one of the key lenses continuously researched and improved by the major brands of portable electronic products, such as smart phones.

With the continuous development of portable electronic products, such as smart phones, people have put forward higher requirements for the performance of camera lens groups of portable electronic products, such as smart phones. In the case of insufficient light (such as rainy days, dusk, etc.), hand shaking, etc., an F number above 2.0 cannot meet the higher-order imaging requirements. Since the multi-piece camera lens group provides more design freedom, the more possibilities will be provided to the improvement of the performance of the portable electronic products, such as smart phones.

SUMMARY

In one aspect, the present disclosure provides a camera lens group which includes, sequentially from an object side to an image side along an optical axis, a first lens, a second lens, a third lens, a fourth lens, a fifth lens, a sixth lens, a seventh lens, an eighth lens, a ninth lens and a tenth lens, and each of the first to the tenth lenses has refractive power. Half of a diagonal length ImgH of an effective pixel area on an imaging plane of the camera lens group may satisfy: ImgH≥6.00 mm.

In one embodiment, at least one of an object-side surface of the first lens to an image-side surface of the tenth lens is aspheric.

In one embodiment, a distance TTL along the optical axis from an object-side surface of the first lens to the imaging plane of the camera lens group and half of the diagonal length ImgH of the effective pixel area on the imaging plane of the camera lens group may satisfy: TTL/ImgH≤1.45.

In one embodiment, a radius of curvature R17 of an object-side surface of the ninth lens and a radius of curvature R18 of an image-side surface of the ninth lens may satisfy: 3.00<(R17+R18)/(R18−R17)<6.00.

In one embodiment, a spaced interval T910 between the ninth lens and the tenth lens along the optical axis and a center thickness CT10 of the tenth lens along the optical axis may satisfy: 3.00<(T910+CT10)/(CT10−T910)<4.00.

In one embodiment, an effective focal length f6 of the sixth lens and a radius of curvature R20 of an image-side surface of the tenth lens may satisfy: 3.00<(f6+R20)/(f6−R20)<6.00.

In one embodiment, a distance SAG91 along the optical axis from an intersection of an object-side surface of the ninth lens and the optical axis to a vertex of an effective radius of the object-side surface of the ninth lens and a distance SAG92 along the optical axis from an intersection of an image-side surface of the ninth lens and the optical axis to a vertex of an effective radius of the image-side surface of the ninth lens may satisfy: 18.00<(SAG91+SAG92)/(SAG91−SAG92)<28.00.

In one embodiment, a maximum effective radius DT101 of an object-side surface of the tenth lens and a maximum effective radius DT102 of an image-side surface of the tenth lens may satisfy: 20.00<(DT101+DT102)/(DT102−DT101)<31.00.

In one embodiment, a maximum effective radius DT91 of an object-side surface of the ninth lens and a maximum effective radius DT92 of an image-side surface of the ninth lens may satisfy: 11.00<(DT91+DT92)/(DT92−DT91)<15.00.

In one embodiment, an edge thickness ET8 of the eighth lens and an edge thickness ET10 of the tenth lens may satisfy: 4.00<(ET8+ET10)/(ET10−ET8)<10.00.

In one embodiment, a combined focal length f89 of the eighth lens and the ninth lens and a combined focal length f910 of the ninth lens and the tenth lens may satisfy: 3.00<f89/f910<8.00.

In one embodiment, an effective focal length f9 of the ninth lens and a radius of curvature R19 of an object-side surface of the tenth lens may satisfy: 3.00<f9/R19<6.00.

The present disclosure provides a camera lens group that is applicable to portable electronic products and has at least one of the beneficial effects of ultra-thin, large aperture, large imaging plane, and good image quality by reasonably configuring the refractive power and optimizing optical parameters.

BRIEF DESCRIPTION OF THE DRAWINGS

Other features, objects, and advantages of the present disclosure will become more apparent by reading the detailed description of the non-limiting embodiments with reference to the accompanying drawings:

FIGS. 10A to 10D illustrate longitudinal aberration curves, astigmatic curves, a distortion curve, and a lateral color curve of the camera lens group of the example 5, respectively;

FIG. 11 illustrates a schematic structural view of a camera lens group according to example 6 of the present disclosure;

DETAILED DESCRIPTION OF EMBODIMENTS

Figure 1:
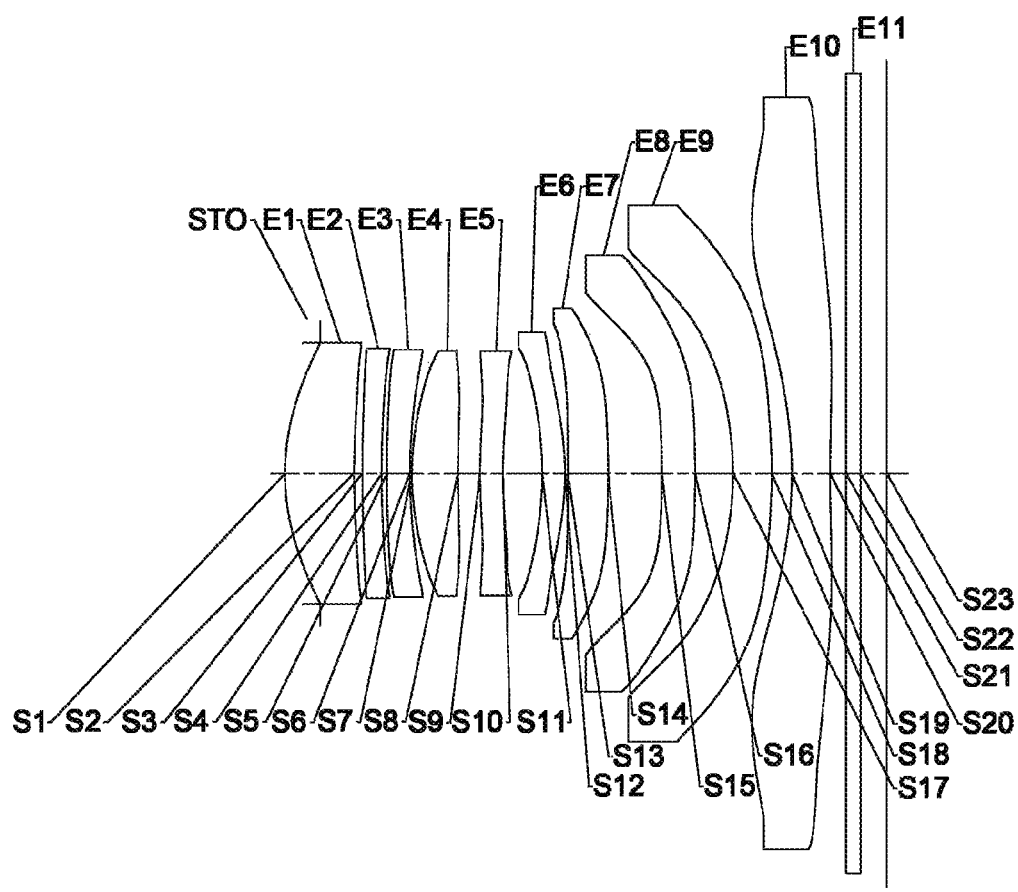
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include ten lenses having refractive power, which are a first lens, a second lens, a third lens, a fourth lens, a fifth lens, a sixth lens, a seventh lens, an eighth lens, a ninth lens and a tenth lens. The ten lenses are arranged sequentially from an object side to an image side along an optical axis. Among the first lens to the tenth lens, there may be a spaced interval between each two adjacent lenses.

In an exemplary embodiment, the first lens with positive refractive power and the second lens with refractive power are beneficial to increasing the field-of-view, and at the same time, beneficial to compressing the incident angle of the light at the position of the stop, reducing pupil aberration, and thereby improving the image quality. The third lens with negative refractive power and the fourth lens with positive refractive power are beneficial to reducing spherical aberration and astigmatic of the camera lens group. The fifth lens with refractive power and the sixth lens with positive refractive power are beneficial for the camera lens group to have features, such as compact structure, large aperture, good image quality, and loose processing characteristics. The seventh lens with positive refractive power and the eighth lens with refractive power are beneficial to reasonably controlling the spherical aberration contributed by the front-end optical group members and the back-end optical group members within a reasonable range, so that the on-axis field-of-view may have good image quality. The ninth lens with negative refractive power and the tenth lens with negative refractive power are beneficial to the realization of large image plane characteristics, and beneficial to obtaining higher light flux in the external field-of-view.

In an exemplary embodiment, the camera lens group according to the present disclosure may satisfy: ImgH≥6.00 mm, where ImgH is half of a diagonal length of an effective pixel area on an imaging plane of the camera lens group. Satisfying ImgH≥6.00 mm is beneficial to the realization of the characteristics of a large image plane.

In an exemplary embodiment, the camera lens group according to the present disclosure may satisfy: TTL/ImgH≤1.45, where TTL is a distance along the optical axis from an object-side surface of the first lens to an imaging plane of the camera lens group, and ImgH is half of a diagonal length of an effective pixel area on the imaging plane of the camera lens group. When TTL/ImgH≤1.45 is satisfied, the ultra-thin characteristics of the camera lens group may be effectively guaranteed.

In an exemplary embodiment, the camera lens group according to the present disclosure may satisfy: 3.00<(R17+R18)/(R18−R17)<6.00, where R17 is a radius of curvature of an object-side surface of the ninth lens, and R18 is a radius of curvature of an image-side surface of the ninth lens. More specifically, R17 and R18 may further satisfy: 3.70<(R17+R18)/(R18−R17)<5.40. When 3.00<(R17+R18)/(R18−R17)<6.00 is satisfied, the thin-thickness ratio of the aspheric surface of the ninth lens may be well controlled, and the coma contributed by the ninth lens may be controlled within a reasonable range, so that the image quality of the on-axis field-of-view and the off-axis field-of-view will not be significantly degraded due to the contribution of coma.

In an exemplary embodiment, the camera lens group according to the present disclosure may satisfy: 3.00<(T910+CT10)/(CT10−T910)<4.00, where T910 is a spaced interval between the ninth lens and the tenth lens along the optical axis, and CT10 is a center thickness of the tenth lens along the optical axis. More specifically, T910 and CT10 may further satisfy: 3.10<(T910+CT10)/(CT10−T910)<3.90. When 3.00<(T910+CT10)/(CT10−T910)<4.00 is satisfied, the shape and thickness of the tenth lens may be effectively restricted, so that the thickness of the lens is uniform, which is convenient for molding and processing.

In an exemplary embodiment, the camera lens group according to the present disclosure may satisfy: 3.00<(f6+R20)/(f6−R20)<6.00, where f6 is an effective focal length of the sixth lens, and R20 is a radius of curvature of an image-side surface of the tenth lens. More specifically, f6 and R20 may further satisfy: 3.00<(f6+R20)/(f6−R20)<5.60. Satisfying 3.00<(f6+R20)/(f6−R20)<6.00 may effectively correct the astigmatic of the camera lens group, thereby ensuring the image quality of the edge field-of-view.

In an exemplary embodiment, the camera lens group according to the present disclosure may satisfy: 18.00<(SAG91+SAG92)/(SAG91−SAG92)<28.00, where SAG91 is a distance along the optical axis from an intersection of an object-side surface of the ninth lens and the optical axis to a vertex of an effective radius of the object-side surface of the ninth lens, and SAG92 is a distance along the optical axis from an intersection of an image-side surface of the ninth lens and the optical axis to a vertex of an effective radius of the image-side surface of the ninth lens. More specifically, SAG91 and SAG92 may further satisfy: 18.70<(SAG91+SAG92)/(SAG91−SAG92)<27.50. When 18.00<(SAG91+SAG92)/(SAG91−SAG92)<28.00 is satisfied, the shape and thickness of the ninth lens may be effectively restricted, so that the thickness of the lens is uniform, which is convenient for molding and processing.

In an exemplary embodiment, the camera lens group according to the present disclosure may satisfy: 20.00<(DT101+DT102)/(DT102−DT101)<31.00, where DT101 is a maximum effective radius of an object-side surface of the tenth lens, and DT102 is a maximum effective radius of an image-side surface of the tenth lens. More specifically, DT101 and DT102 may further satisfy: 20.10<(DT101+DT102)/(DT102−DT101)<30.60. When 20.00<(DT101+DT102)/(DT102−DT101)<31.00 is satisfied, the aperture of the tenth lens may be effectively restricted to ensure that the aperture difference of the camera lens group is within a reasonable processing range, which is convenient for molding and assembly. At the same time, by doing so, the external field-of-view may get more light.

In an exemplary embodiment, the camera lens group according to the present disclosure may satisfy: 11.00<(DT91+DT92)/(DT92−DT91)<15.00, where DT91 is a maximum effective radius of an object-side surface of the ninth lens, and DT92 is a maximum effective radius of an image-side surface of the ninth lens. More specifically, DT91 and DT92 may further satisfy: 11.30<(DT91+DT92)/(DT92−DT91)<14.60. When 11.00<(DT91+DT92)/(DT92−DT91)<15.00 is satisfied, the aperture of the ninth lens may be effectively restricted to ensure that the aperture difference between adjacent lenses of the camera lens group is within a reasonable processing range, which is convenient for molding and assembly. At the same time, by doing so, the external field-of-view may get more light.

In an exemplary embodiment, the camera lens group according to the present disclosure may satisfy: 4.00<(ET8+ET10)/(ET10−ET8)<10.00, where ET8 is an edge thickness of the eighth lens, and ET10 is an edge thickness of the tenth lens. More specifically, ET8 and ET10 may further satisfy: 4.50<(ET8+ET10)/(ET10−ET8)<9.80. Satisfying 4.00<(ET8+ET10)/(ET10−ET8)<10.00 may effectively restrict the shape and thickness of the eighth lens and the tenth lens, so that the thicknesses of the two lenses are uniform, which is convenient for molding and processing.

In an exemplary embodiment, the camera lens group according to the present disclosure may satisfy: 3.00<f89/f910<8.00, where f89 is a combined focal length of the eighth lens and the ninth lens, and f910 is a combined focal length of the ninth lens and the tenth lens. More specifically, f89 and f910 may further satisfy: 3.00<f89/f910<7.50. Satisfying 3.00<f89/f910<8.00 may reasonably control the spherical aberration contributed by the eighth lens, the ninth lens and the tenth lens within a reasonable range, which is beneficial to obtaining good image quality at the on-axis field-of-view.

In an exemplary embodiment, the camera lens group according to the present disclosure may satisfy: 3.00<f9/R19<6.00, where f9 is an effective focal length of the ninth lens, and R19 is a radius of curvature of an object-side surface of the tenth lens. Satisfying 3.00<f9/R19<6.00 may effectively correct the astigmatic of the ninth lens and the tenth lens, thereby ensuring the image quality at the edge field-of-view.

In an exemplary embodiment, the camera lens group according to the present disclosure further includes a stop disposed between the object side and the first lens. Optionally, the above camera lens group may further include an optical filter for correcting the color deviation and/or a protective glass for protecting the photosensitive element located on an imaging plane. The present disclosure proposes a camera lens group with features, such as ultra-thin, large aperture, large image plane, and high image quality. Under the premise of satisfying the large imaging plane, the larger the aperture of the camera lens group with large aperture and ultra-thin characteristics is, the larger the light enter will be, which may effectively increase the shutter speed and better blur the background. The ten-piece lens group with ultra-thin feature may ensure the ultra-thinness of the portable electronic products, such as smart phones, under the premise of fully improving the optical performance, so that the lens group is more suitable for the field-of-view demand and the market trend of the ultra-thin portable electronic products, such as smart phones. The camera lens group according to the above embodiments of the present disclosure may employ a plurality of lenses, such as ten lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the camera lens group is more advantageous for production processing.

In the embodiments of the present disclosure, at least one of the surfaces of lenses is aspheric, that is, at least one of the object-side surface of the first lens to the image-side surface of the tenth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens, the eighth lens, the ninth lens and the tenth lens is aspheric. Optionally, the object-side surface and the image-side surface of each of the first lens, the second lens, the third lens, the fourth lens, the fifth lens, the sixth lens, the seventh lens, the eighth lens, the ninth lens and the tenth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking ten lenses as an example, the camera lens group is not limited to include ten lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is concave, and an image-side surface S14 thereof is convex. The eighth lens E8 has negative refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.5101 | | | | |
| S1 | Aspheric | 3.3625 | 1.0000 | 1.55 | 56.1 | 8.26 | −0.4483 |
| S2 | Aspheric | 11.8333 | 0.1190 | | | | −70.2209 |
| S3 | Aspheric | 23.8270 | 0.2800 | 1.67 | 20.4 | −135.07 | −99.0000 |
| S4 | Aspheric | 18.7517 | 0.0777 | | | | 84.9914 |
| S5 | Aspheric | 45.3748 | 0.3300 | 1.67 | 20.4 | −14.97 | 99.0000 |
| S6 | Aspheric | 8.1557 | 0.0282 | | | | −36.6560 |
| S7 | Aspheric | 4.0785 | 0.6650 | 1.55 | 56.1 | 10.59 | 0.8723 |
| S8 | Aspheric | 13.0402 | 0.3196 | | | | 37.8255 |
| S9 | Aspheric | 7.4681 | 0.3300 | 1.67 | 20.4 | 578.79 | −12.8419 |
| S10 | Aspheric | 7.4809 | 0.5689 | | | | −79.1084 |
| S11 | Aspheric | −5.2399 | 0.3300 | 1.55 | 56.1 | 38.65 | 2.8275 |
| S12 | Aspheric | −4.2910 | 0.0400 | | | | −0.0608 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S13 | Aspheric | −75.9387 | 0.5828 | 1.68 | 19.2 | 28.47 | 99.0000 |
| S14 | Aspheric | −15.4306 | 0.7764 | | | | 15.3613 |
| S15 | Aspheric | −16.4199 | 0.4800 | 1.67 | 20.4 | −170.95 | −50.8064 |
| S16 | Aspheric | −19.4092 | 0.5491 | | | | 33.6141 |
| S17 | Aspheric | −4.4448 | 0.5600 | 1.62 | 23.5 | −17.75 | 0.0157 |
| S18 | Aspheric | −7.6273 | 0.2918 | | | | 0.9507 |
| S19 | Aspheric | −5.5458 | 0.5500 | 1.55 | 56.1 | −7.86 | −2.2568 |
| S20 | Aspheric | 19.6672 | 0.2327 | | | | 11.5210 |
| S21 | Spherical | Infinite | 0.2100 | 1.52 | 64.2 | | |
| S22 | Spherical | Infinite | 0.3787 | | | | |
| S23 | Spherical | Infinite | | | | | |

In this example, a total effective focal length f of the camera lens group is 7.58 mm, a total length TTL of the camera lens group (that is, a distance along the optical axis from the object-side surface S1 of the first lens E1 to the imaging plane S23 of the camera lens group) is 8.70 mm, half of a diagonal length ImgH of an effective pixel area on the imaging plane S23 of the camera lens group is 6.00 mm, half of a maximum field-of-view Semi-FOV of the camera lens group is 37.7°, and an aperture value Fno of the camera lens group is 2.00.

In example 1, the object-side surface and the image-side surface of any one of the first lens E1 to the tenth lens E10 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S20 in example 1.

TABLE 2

| Surface number | A4 | A6 | A8 | A10 | A12 |
|---|---|---|---|---|---|
| S1 | −1.4948E−03 | −1.0414E−03 | 7.1033E−04 | −8.0201E−04 | 5.3230E−04 |
| S2 | 6.0169E−03 | −2.0796E−02 | 2.1641E−02 | −1.3662E−02 | 5.5191E−03 |
| S3 | 8.0252E−03 | −3.5696E−02 | 5.1437E−02 | −3.9592E−02 | 1.8171E−02 |
| S4 | 7.7738E−03 | −4.2233E−02 | 8.0176E−02 | −7.1386E−02 | 3.3734E−02 |
| S5 | 1.7547E−02 | −3.2131E−02 | 5.5466E−02 | −5.1856E−02 | 2.5955E−02 |
| S6 | 2.2184E−02 | −3.7801E−02 | 4.6588E−02 | −4.1093E−02 | 2.4854E−02 |
| S7 | −2.7890E−03 | −2.7736E−02 | 3.8217E−02 | −3.1352E−02 | 1.7797E−02 |
| S8 | −1.7648E−02 | −7.4677E−04 | −2.0325E−03 | 2.3367E−03 | −1.0247E−03 |
| S9 | −2.2504E−02 | −4.3248E−03 | −2.8816E−04 | 1.6554E−03 | 5.9377E−05 |
| S10 | 7.6915E−03 | −1.8685E−02 | 1.2341E−02 | −9.0251E−03 | 6.9917E−03 |
| S11 | −1.6030E−03 | 1.9430E−02 | −1.5756E−02 | 7.1211E−03 | −2.5852E−03 |
| S12 | 4.3641E−03 | 7.5875E−03 | 3.5841E−03 | −8.8370E−03 | 6.4107E−03 |
| S13 | 6.7436E−03 | −2.0069E−02 | 1.7623E−02 | −1.1265E−02 | 4.8033E−03 |
| S14 | 8.1161E−03 | −1.8757E−02 | 1.1739E−02 | −5.4793E−03 | 1.7314E−03 |
| S15 | −5.1449E−03 | −1.8385E−02 | 8.6544E−03 | −2.4653E−03 | 3.1301E−04 |
| S16 | 3.7847E−03 | −1.6619E−02 | 7.4834E−03 | −1.9045E−03 | 3.0934E−04 |
| S17 | 2.0545E−02 | −1.3323E−02 | 2.8069E−03 | 3.0257E−04 | −2.6007E−04 |
| S18 | 2.7788E−02 | −1.4120E−02 | 3.7334E−03 | −5.9416E−04 | 5.5463E−05 |
| S19 | 1.1786E−02 | −4.4669E−03 | 9.3638E−04 | −1.0947E−04 | 7.8485E−06 |
| S20 | −1.1154E−02 | 2.5811E−03 | −5.1680E−04 | 7.0211E−05 | −6.0090E−06 |

| Surface number | A14 | A16 | A18 | A20 |
|---|---|---|---|---|
| S1 | −2.1493E−04 | 5.1958E−05 | −6.7735E−06 | 3.6604E−07 |
| S2 | −1.3643E−03 | 1.9544E−04 | −1.4240E−05 | 3.5522E−07 |
| S3 | −5.0706E−03 | 8.3909E−04 | −7.5422E−05 | 2.8198E−06 |
| S4 | −8.7132E−03 | 1.1472E−03 | −5.5473E−05 | −8.5064E−07 |
| S5 | −7.0452E−03 | 9.7963E−04 | −5.3952E−05 | −1.5944E−07 |
| S6 | −9.6970E−03 | 2.3355E−03 | −3.2001E−04 | 1.9239E−05 |
| S7 | −6.7616E−03 | 1.6263E−03 | −2.2280E−04 | 1.3161E−05 |
| S8 | 5.7497E−05 | 1.2369E−04 | −4.1716E−05 | 4.0549E−06 |
| S9 | −5.4591E−04 | 3.1197E−04 | −8.0762E−05 | 7.8286E−06 |
| S10 | −3.6492E−03 | 1.1804E−03 | −2.1175E−04 | 1.5770E−05 |
| S11 | 8.8844E−04 | −2.7409E−04 | 5.7218E−05 | −5.3761E−06 |
| S12 | −2.5188E−03 | 5.7232E−04 | −7.1171E−05 | 3.7635E−06 |

TABLE 2-continued

| | | | | |
|---|---|---|---|---|
| S13 | −1.2860E−03 | 2.0767E−04 | −1.8492E−05 | 6.8723E−07 |
| S14 | −3.5415E−04 | 4.5833E−05 | −3.4323E−06 | 1.1211E−07 |
| S15 | 1.9862E−05 | −1.0688E−05 | 1.1655E−06 | −4.3676E−08 |
| S16 | −3.2612E−05 | 2.2164E−06 | −9.1579E−08 | 1.7924E−09 |
| S17 | 5.2019E−05 | −5.0589E−06 | 2.4728E−07 | −4.8679E−09 |
| S18 | −2.7700E−06 | 5.0019E−08 | 1.0438E−09 | −4.0571E−11 |
| S19 | −3.5355E−07 | 9.7358E−09 | −1.4922E−10 | 9.7034E−13 |
| S20 | 3.1805E−07 | −1.0081E−08 | 1.7509E−10 | −1.2809E−12 |

Figure 2A:
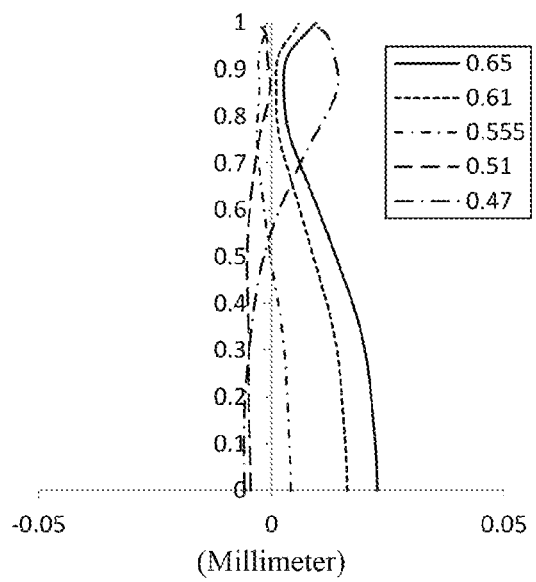
FIGS. 2A to 2D illustrate longitudinal aberration curves, astigmatic curves, a distortion curve, and a lateral color curve of the camera lens group of the example 1, respectively.
Figure 2B:
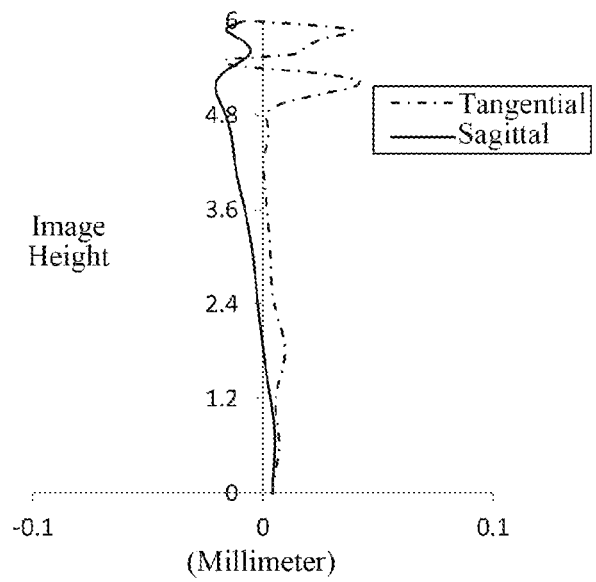
Figure 2C:
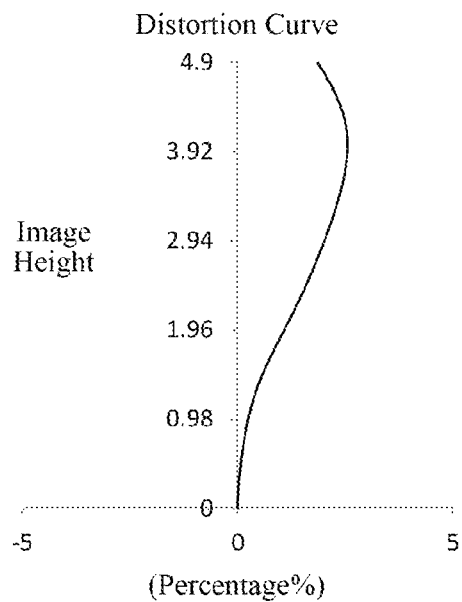
Figure 2D:
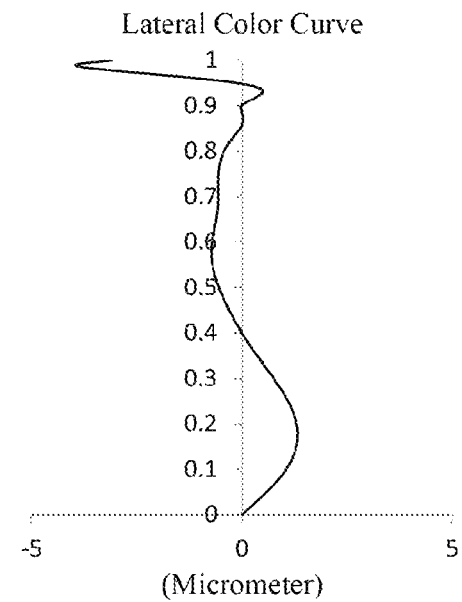

FIG. 2A illustrates longitudinal aberration curves of the camera lens group according to example 1, representing the deviations of focal points converged by light of different wavelengths after passing through the lens group. FIG. 2B illustrates astigmatic curves of the camera lens group according to example 1, representing the curvatures of a tangential plane and the curvatures of a sagittal plane. FIG. 2C illustrates a distortion curve of the camera lens group according to example 1, representing the amounts of distortion corresponding to different image heights. FIG. 2D illustrates a lateral color curve of the camera lens group according to example 1, representing the deviations of different image heights on an imaging plane after light passes through the lens group. It can be seen from FIG. 2A to FIG. 2D that the camera lens group provided in example 1 may achieve good image quality.

Example 2

Figure 3:
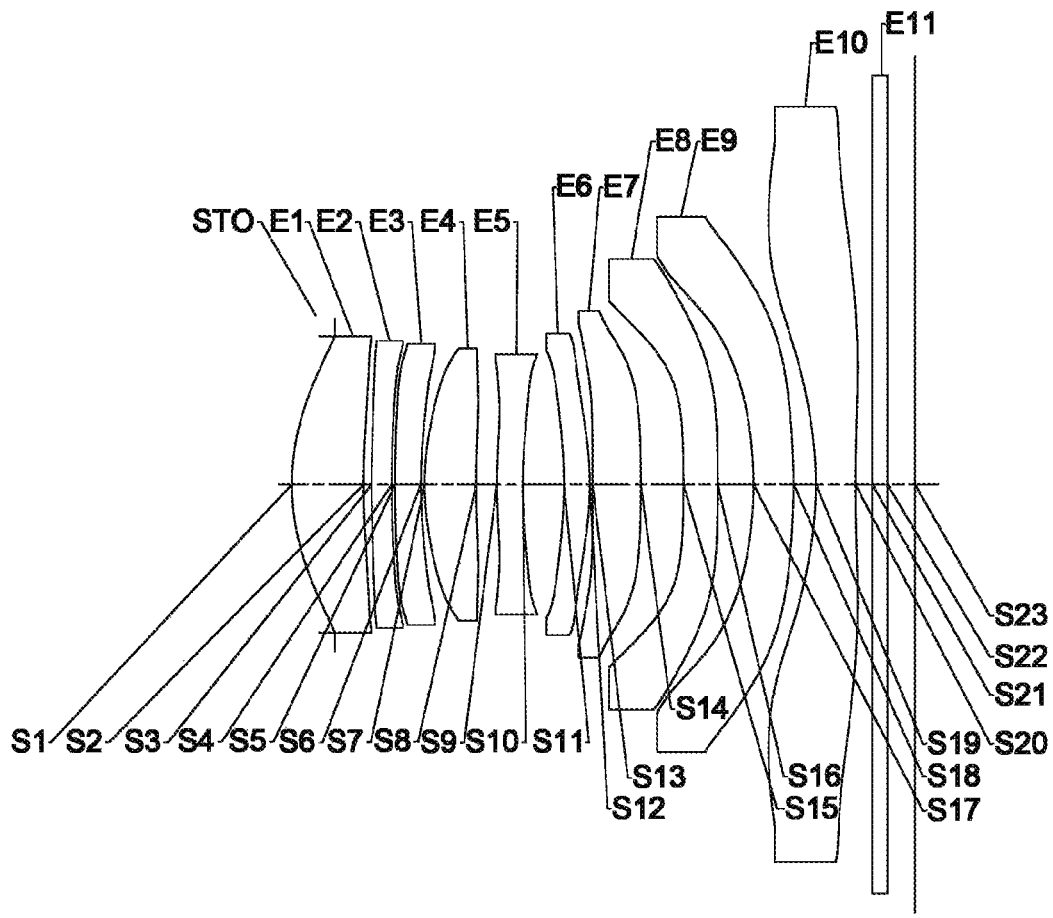
FIG. 3 illustrates a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is convex, and an image-side surface S14 thereof is convex. The eighth lens E8 has negative refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

In this example, a total effective focal length f of the camera lens group is 7.47 mm, a total length TTL of the camera lens group is 8.70 mm, half of a diagonal length ImgH of an effective pixel area on the imaging plane S23 of the camera lens group is 6.00 mm, half of a maximum field-of-view Semi-FOV of the camera lens group is 38.1°, and an aperture value Fno of the camera lens group is 1.80.

Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5988 | | | | |
| S1 | Aspheric | 3.2859 | 1.0000 | 1.55 | 56.1 | 8.49 | −0.4815 |
| S2 | Aspheric | 10.0881 | 0.1147 | | | | −99.0000 |
| S3 | Aspheric | 17.9836 | 0.2800 | 1.67 | 20.4 | 4455.75 | −99.0000 |
| S4 | Aspheric | 17.9805 | 0.0466 | | | | 72.2401 |
| S5 | Aspheric | 31.6582 | 0.3600 | 1.67 | 20.4 | −15.83 | 99.0000 |
| S6 | Aspheric | 7.8764 | 0.0522 | | | | −47.2225 |
| S7 | Aspheric | 4.0503 | 0.7197 | 1.55 | 56.1 | 11.02 | 0.9898 |
| S8 | Aspheric | 11.6107 | 0.2898 | | | | 34.4286 |
| S9 | Aspheric | 7.2179 | 0.3600 | 1.67 | 20.4 | −130.47 | −18.0839 |
| S10 | Aspheric | 6.5317 | 0.5758 | | | | −49.4145 |
| S11 | Aspheric | −6.5303 | 0.3600 | 1.55 | 56.1 | 31.92 | −0.1545 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S12 | Aspheric | −4.8429 | 0.0400 | | | | 0.4756 |
| S13 | Aspheric | 460.7189 | 0.6743 | 1.68 | 19.2 | 30.04 | −99.0000 |
| S14 | Aspheric | −21.2807 | 0.5946 | | | | 36.4106 |
| S15 | Aspheric | −18.4478 | 0.4800 | 1.67 | 20.4 | −795.95 | −44.3371 |
| S16 | Aspheric | −19.3113 | 0.4985 | | | | 32.3527 |
| S17 | Aspheric | −5.0809 | 0.5600 | 1.62 | 23.5 | −23.49 | 0.1872 |
| S18 | Aspheric | −7.9774 | 0.3122 | | | | 1.1599 |
| S19 | Aspheric | −4.8950 | 0.5500 | 1.55 | 56.1 | −7.11 | −2.1423 |
| S20 | Aspheric | 19.4822 | 0.2379 | | | | 11.5595 |
| S21 | Spherical | Infinite | 0.2100 | 1.52 | 64.2 | | |
| S22 | Spherical | Infinite | 0.3838 | | | | |
| S23 | Spherical | Infinite | | | | | |

TABLE 4

| Surface number | A4 | A6 | A8 | A10 | A12 |
|---|---|---|---|---|---|
| S1 | −1.1402E−03 | −5.1489E−04 | −3.8154E−04 | 4.0565E−04 | −2.8373E−04 |
| S2 | 8.1436E−03 | −2.5434E−02 | 3.1202E−02 | −2.4023E−02 | 1.1853E−02 |
| S3 | −2.1625E−03 | −3.3380E−02 | 6.2129E−02 | −5.6455E−02 | 3.1073E−02 |
| S4 | 1.3667E−02 | −7.3019E−02 | 1.3217E−01 | −1.3019E−01 | 7.8018E−02 |
| S5 | 3.1401E−02 | −6.9394E−02 | 9.9903E−02 | −9.3133E−02 | 5.5400E−02 |
| S6 | 2.6730E−02 | −4.6583E−02 | 4.2035E−02 | −2.5998E−02 | 1.2035E−02 |
| S7 | −9.2111E−04 | −2.6816E−02 | 2.5163E−02 | −1.1353E−02 | 2.0684E−03 |
| S8 | −1.7947E−02 | 3.5494E−04 | −3.4258E−03 | 3.5218E−03 | −2.0922E−03 |
| S9 | −2.7480E−02 | −1.3736E−03 | −4.5046E−03 | 6.9445E−03 | −3.7976E−03 |
| S10 | 3.7569E−03 | −1.3465E−02 | 7.8879E−03 | −4.4665E−03 | 3.9473E−03 |
| S11 | 5.9302E−03 | 1.0045E−02 | −1.2225E−02 | −9.1160E−03 | 8.4495E−03 |
| S12 | −9.1640E−03 | 4.3003E−02 | −2.8557E−02 | 5.5779E−03 | 3.0571E−03 |
| S13 | −1.7345E−02 | 1.7449E−02 | −1.5023E−02 | 5.7195E−03 | −8.9405E−04 |
| S14 | 5.8873E−04 | −1.8396E−02 | 1.4373E−02 | −8.0787E−03 | 2.9337E−03 |
| S15 | 3.2097E−03 | −2.8815E−02 | 1.4440E−02 | −4.2417E−03 | 5.9959E−04 |
| S16 | 1.5946E−02 | −2.8072E−02 | 1.3533E−02 | −3.7252E−03 | 6.4635E−04 |
| S17 | 2.1918E−02 | −1.8796E−02 | 6.3406E−03 | −8.9663E−04 | −2.5024E−05 |
| S18 | 2.4124E−02 | −1.3996E−02 | 4.0405E−03 | −7.1808E−04 | 7.7192E−05 |
| S19 | 1.5657E−02 | −7.0438E−03 | 1.6013E−03 | −2.0066E−04 | 1.5439E−05 |
| S20 | −5.8406E−03 | 4.5495E−05 | 6.1600E−05 | −5.9718E−06 | 8.3891E−08 |

| Surface number | A14 | A16 | A18 | A20 |
|---|---|---|---|---|
| S1 | 1.0994E−04 | −2.4221E−05 | 2.8885E−06 | −1.4389E−07 |
| S2 | −3.6895E−03 | 6.9446E−04 | −7.1463E−05 | 3.0604E−06 |
| S3 | −1.0741E−02 | 2.2661E−03 | −2.6556E−04 | 1.3217E−05 |
| S4 | −2.9287E−02 | 6.7331E−03 | −8.6504E−04 | 4.7405E−05 |
| S5 | −2.0769E−02 | 4.7724E−03 | −6.1369E−04 | 3.3671E−05 |
| S6 | −3.8991E−03 | 8.2554E−04 | −1.0380E−04 | 5.8488E−06 |
| S7 | 5.5959E−04 | −3.9434E−04 | 8.3592E−05 | −6.5378E−06 |
| S8 | 8.5500E−04 | −2.2529E−04 | 3.7290E−05 | −3.1739E−06 |
| S9 | 1.3184E−03 | −3.0041E−04 | 3.9308E−05 | −2.3941E−06 |
| S10 | −2.2473E−03 | 7.2991E−04 | −1.2643E−04 | 9.0223E−06 |
| S11 | −3.6058E−03 | 8.1661E−04 | −9.3028E−05 | 4.0231E−06 |
| S12 | −2.1629E−03 | 5.5968E−04 | −6.9048E−05 | 3.3694E−06 |
| S13 | −3.3608E−05 | 3.4545E−05 | −4.9532E−06 | 2.4014E−07 |
| S14 | −6.7423E−04 | 9.5385E−05 | −7.5081E−06 | 2.4869E−07 |
| S15 | 1.0741E−05 | −1.5083E−05 | 1.8098E−06 | −7.1037E−08 |
| S16 | −7.2101E−05 | 5.0683E−06 | −2.0632E−07 | 3.7292E−09 |
| S17 | 2.3892E−05 | −2.9892E−06 | 1.6071E−07 | −3.3012E−09 |
| S18 | −4.6598E−06 | 1.2608E−07 | 2.3849E−10 | −5.7285E−11 |
| S19 | −7.5286E−07 | 2.2731E−08 | −3.8754E−10 | 2.8465E−12 |
| S20 | 1.8689E−08 | −1.2734E−09 | 3.3057E−11 | −3.1766E−13 |

Figure 4A:
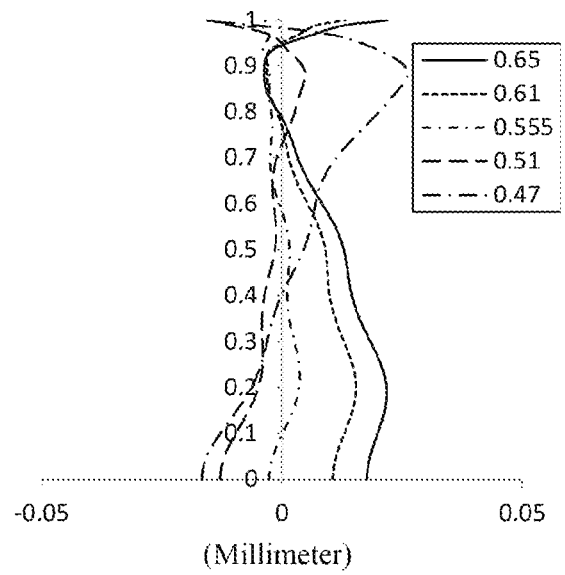
FIGS. 4A to 4D illustrate longitudinal aberration curves, astigmatic curves, a distortion curve, and a lateral color curve of the camera lens group of the example 2, respectively.
Figure 4B:
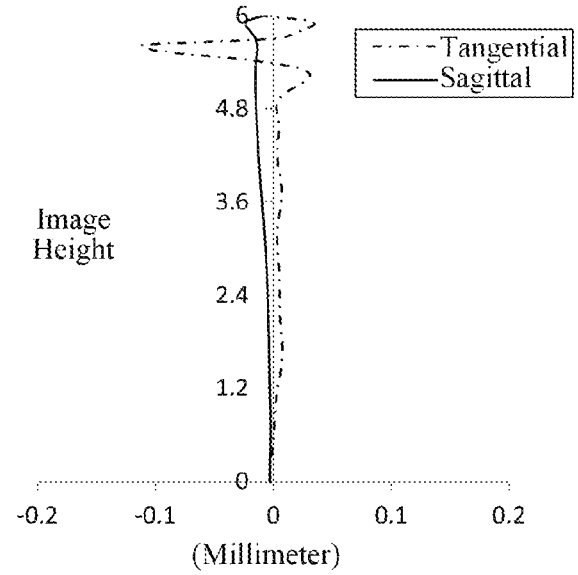
Figure 4C:
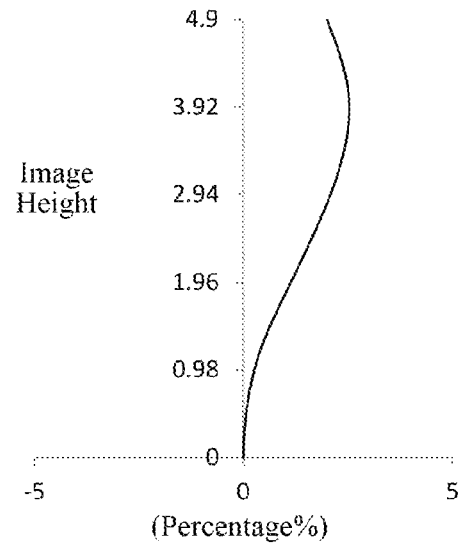
Figure 4D:
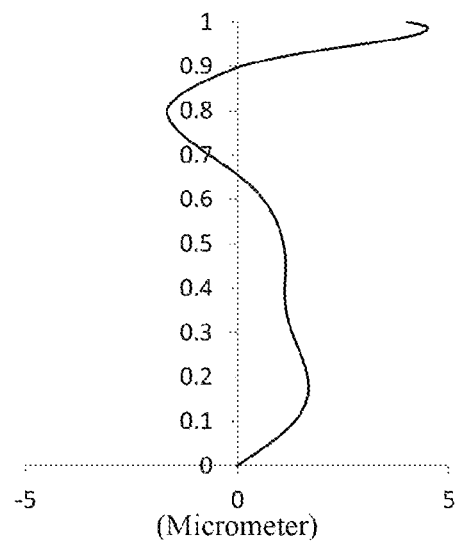

FIG. 4A illustrates longitudinal aberration curves of the camera lens group according to example 2, representing the deviations of focal points converged by light of different wavelengths after passing through the lens group. FIG. 4B illustrates astigmatic curves of the camera lens group according to example 2, representing the curvatures of a tangential plane and the curvatures of a sagittal plane. FIG. 4C illustrates a distortion curve of the camera lens group according to example 2, representing the amounts of distortion corresponding to different image heights. FIG. 4D illustrates a lateral color curve of the camera lens group according to example 2, representing the deviations of different image heights on an imaging plane after light passes through the lens group. It can be seen from FIG. 4A to FIG. 4D that the camera lens group provided in example 2 may achieve good image quality.

Example 3

Figure 5:
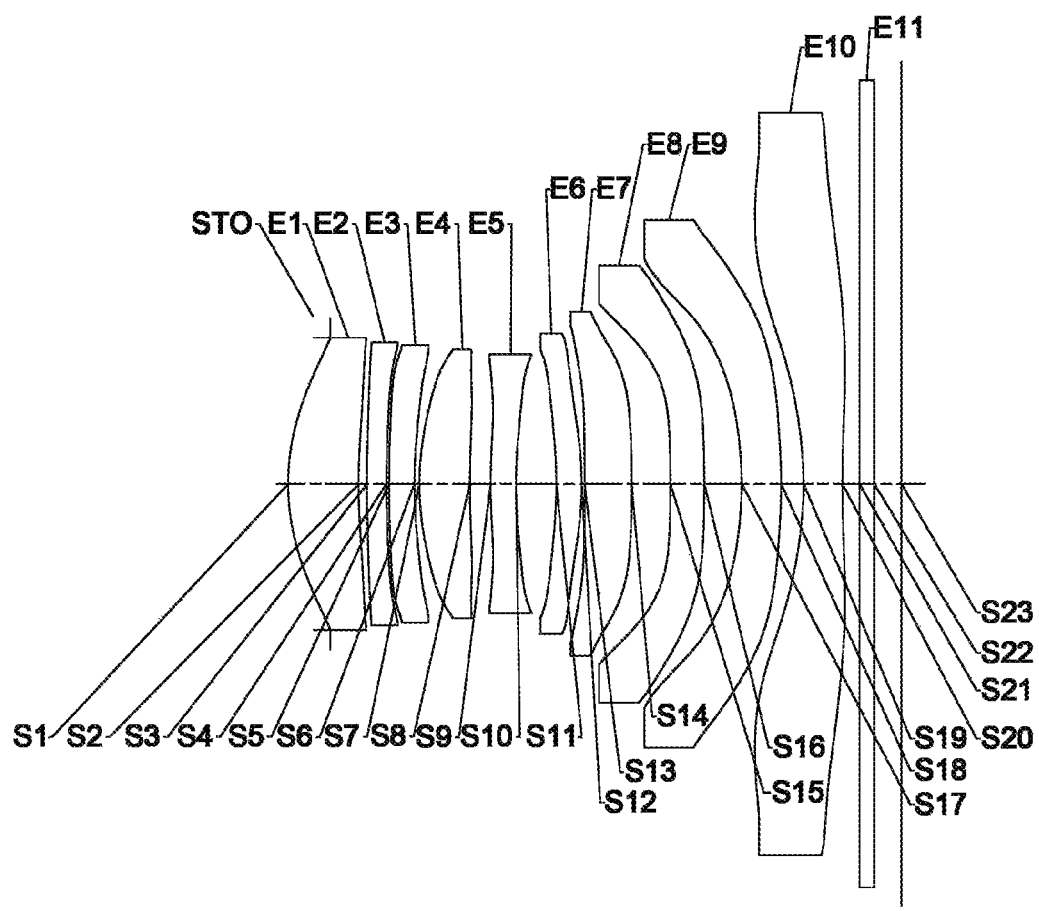
FIG. 5 illustrates a schematic structural view of a camera lens group according to example 3 of the present disclosure.

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is convex, and an image-side surface S14 thereof is convex. The eighth lens E8 has positive refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

In this example, a total effective focal length f of the camera lens group is 7.47 mm, a total length TTL of the camera lens group is 8.70 mm, half of a diagonal length ImgH of an effective pixel area on the imaging plane S23 of the camera lens group is 6.00 mm, half of a maximum field-of-view Semi-FOV of the camera lens group is 38.1°, and an aperture value Fno of the camera lens group is 1.80.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5995 | | | | |
| S1 | Aspheric | 3.2704 | 1.0000 | 1.55 | 56.1 | 8.84 | −0.4837 |
| S2 | Aspheric | 9.0467 | 0.1158 | | | | −99.0000 |
| S3 | Aspheric | 14.9683 | 0.2800 | 1.67 | 20.4 | 136.14 | −99.0000 |
| S4 | Aspheric | 17.7916 | 0.0371 | | | | 70.2877 |
| S5 | Aspheric | 31.4201 | 0.3600 | 1.67 | 20.4 | −15.29 | 99.0000 |
| S6 | Aspheric | 7.6591 | 0.0686 | | | | −47.9903 |
| S7 | Aspheric | 3.9950 | 0.7153 | 1.55 | 56.1 | 10.83 | 0.9082 |
| S8 | Aspheric | 11.5375 | 0.2951 | | | | 34.0759 |
| S9 | Aspheric | 7.0934 | 0.3600 | 1.67 | 20.4 | −92.47 | −17.5657 |
| S10 | Aspheric | 6.2320 | 0.5730 | | | | −42.6639 |
| S11 | Aspheric | −6.7456 | 0.3600 | 1.55 | 56.1 | 30.27 | −1.7921 |
| S12 | Aspheric | −4.8806 | 0.0400 | | | | 0.3532 |
| S13 | Aspheric | 463.7900 | 0.6679 | 1.68 | 19.2 | 34.11 | −99.0000 |
| S14 | Aspheric | −24.3077 | 0.5507 | | | | 42.7335 |
| S15 | Aspheric | −20.4466 | 0.4805 | 1.67 | 20.4 | 164.83 | −56.2219 |
| S16 | Aspheric | −17.4000 | 0.5302 | | | | 26.9294 |
| S17 | Aspheric | −5.0711 | 0.5600 | 1.62 | 23.5 | −23.89 | 0.2755 |
| S18 | Aspheric | −7.8886 | 0.3198 | | | | 1.1202 |
| S19 | Aspheric | −4.7899 | 0.5500 | 1.55 | 56.1 | −6.98 | −2.0978 |
| S20 | Aspheric | 19.3895 | 0.2400 | | | | 11.5551 |
| S21 | Spherical | Infinite | 0.2100 | 1.52 | 64.2 | | |
| S22 | Spherical | Infinite | 0.3860 | | | | |
| S23 | Spherical | Infinite | | | | | |

TABLE 6

| Surface number | A4 | A6 | A8 | A10 | A12 |
|---|---|---|---|---|---|
| S1 | −9.5292E−04 | −9.0850E−04 | 1.9919E−04 | −8.4384E−05 | −4.2345E−05 |
| S2 | 8.5426E−03 | −2.4112E−02 | 2.9759E−02 | −2.4394E−02 | 1.3003E−02 |
| S3 | −8.3315E−03 | −2.2264E−02 | 5.1714E−02 | −5.1594E−02 | 3.0485E−02 |

TABLE 6-continued

| S4 | 1.2456E−02 | −7.4579E−02 | 1.3894E−01 | −1.3919E−01 | 8.4369E−02 |
| --- | --- | --- | --- | --- | --- |
| S5 | 3.6418E−02 | −8.5220E−02 | 1.2267E−01 | −1.1298E−01 | 6.6139E−02 |
| S6 | 3.2576E−02 | −5.8579E−02 | 5.6485E−02 | −3.8061E−02 | 1.8375E−02 |
| S7 | 3.2883E−03 | −3.4037E−02 | 3.5109E−02 | −2.1983E−02 | 8.9218E−03 |
| S8 | −1.7089E−02 | −9.6226E−06 | −2.9027E−03 | 2.6504E−03 | −1.6210E−03 |
| S9 | −2.7664E−02 | −8.4537E−04 | −5.2458E−03 | 8.4693E−03 | −5.7128E−03 |
| S10 | 3.2988E−03 | −1.2074E−02 | 6.2231E−03 | −2.3342E−03 | 2.0756E−03 |
| S11 | 7.0194E−03 | 9.4172E−03 | −2.8315E−03 | −5.8174E−03 | 5.8715E−03 |
| S12 | −8.3699E−03 | 4.2656E−02 | −3.0663E−02 | 9.0338E−03 | 6.7284E−04 |
| S13 | −1.8221E−02 | 1.7401E−02 | −1.5112E−02 | 6.1031E−03 | −1.1680E−03 |
| S14 | 6.5268E−04 | −2.0311E−02 | 1.6212E−02 | −9.1267E−03 | 3.3285E−03 |
| S15 | 7.3699E−03 | −3.4727E−02 | 1.9290E−02 | −6.6973E−03 | 1.4366E−03 |
| S16 | 1.8242E−02 | −3.1689E−02 | 1.5979E−02 | −4.6061E−03 | 8.3762E−04 |
| S17 | 2.2183E−02 | −1.9604E−02 | 6.6587E−03 | −9.2492E−04 | −4.0379E−05 |
| S18 | 2.6285E−02 | −1.4480E−02 | 4.0258E−03 | −7.0304E−04 | 7.4611E−05 |
| S19 | 1.9691E−02 | −9.0573E−03 | 2.0506E−03 | −2.5980E−04 | 2.0423E−05 |
| S20 | −3.0014E−03 | −1.4586E−03 | 3.9297E−04 | −4.6093E−05 | 3.0123E−06 |

| Surface number | A14 | A16 | A18 | A20 |
| --- | --- | --- | --- | --- |
| S1 | 3.7531E−05 | −1.1262E−05 | 1.6196E−06 | −9.1808E−08 |
| S2 | −4.3758E−03 | 8.8977E−04 | −9.9138E−05 | 4.6259E−06 |
| S3 | −1.1177E−02 | 2.4752E−03 | −3.0164E−04 | 1.5488E−05 |
| S4 | −3.1881E−02 | 7.3494E−03 | −9.4413E−04 | 5.1631E−05 |
| S5 | −2.4346E−02 | 5.4877E−03 | −6.9276E−04 | 3.7390E−05 |
| S6 | −5.9111E−03 | 1.2003E−03 | −1.4168E−04 | 7.4662E−06 |
| S7 | −2.1124E−03 | 2.4058E−04 | −2.2583E−06 | −1.4353E−06 |
| S8 | 7.7803E−04 | −2.3482E−04 | 4.1649E−05 | −3.5569E−06 |
| S9 | 2.5960E−03 | −7.6171E−04 | 1.2506E−04 | −8.8718E−06 |
| S10 | −1.2560E−03 | 4.2477E−04 | −7.6529E−05 | 5.6731E−06 |
| S11 | −2.5261E−03 | 5.6412E−04 | −6.2308E−05 | 2.5468E−06 |
| S12 | −1.2650E−03 | 3.6650E−04 | −4.6692E−05 | 2.2882E−06 |
| S13 | 6.2068E−05 | 1.6059E−05 | −3.0663E−06 | 1.6111E−07 |
| S14 | −7.7001E−04 | 1.0956E−04 | −8.6661E−06 | 2.8865E−07 |
| S15 | −1.8066E−04 | 1.2267E−05 | −3.5369E−07 | 6.2844E−10 |
| S16 | −9.8819E−05 | 7.4565E−06 | −3.3060E−07 | 6.5681E−09 |
| S17 | 2.8854E−05 | −3.6028E−06 | 1.9617E−07 | −4.0972E−09 |
| S18 | −4.3602E−06 | 1.0265E−07 | 1.2560E−09 | −7.5282E−11 |
| S19 | −1.0246E−06 | 3.1974E−08 | −5.6519E−10 | 4.3144E−12 |
| S20 | −1.1355E−07 | 2.3416E−09 | −2.1735E−11 | 3.5258E−14 |

Figure 6A:
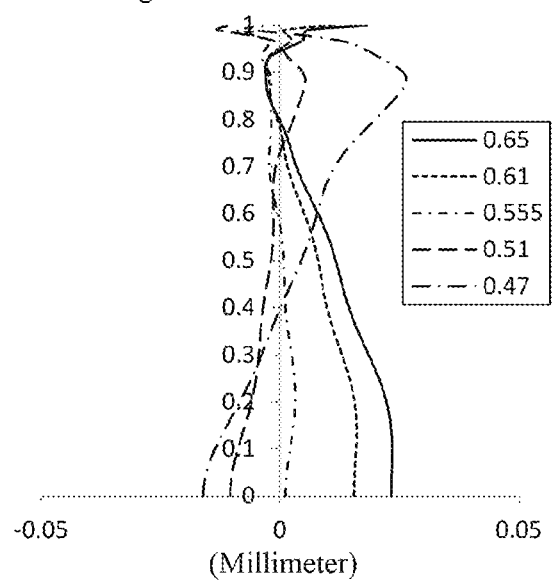
FIGS. 6A to 6D illustrate longitudinal aberration curves, astigmatic curves, a distortion curve, and a lateral color curve of the camera lens group of the example 3, respectively.
Figure 6B:
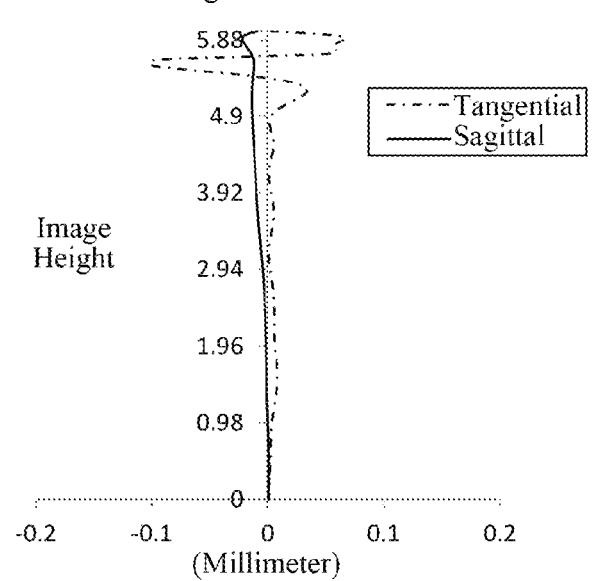
Figure 6C:
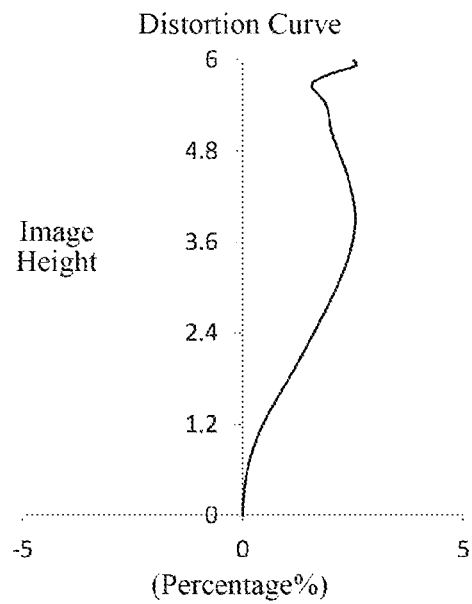
Figure 6D:
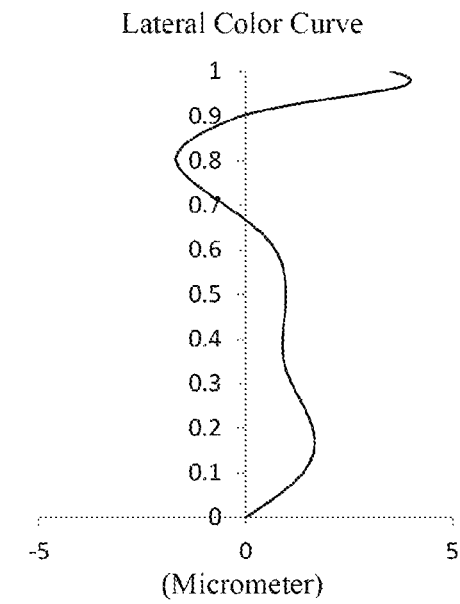

FIG. 6A illustrates longitudinal aberration curves of the camera lens group according to example 3, representing the deviations of focal points converged by light of different wavelengths after passing through the lens group. FIG. 6B illustrates astigmatic curves of the camera lens group according to example 3, representing the curvatures of a tangential plane and the curvatures of a sagittal plane. FIG. 6C illustrates a distortion curve of the camera lens group according to example 3, representing the amounts of distortion corresponding to different image heights. FIG. 6D illustrates a lateral color curve of the camera lens group according to example 3, representing the deviations of different image heights on an imaging plane after light passes through the lens group. It can be seen from FIG. 6A to FIG. 6D that the camera lens group provided in example 3 may achieve good image quality.

Example 4

Figure 7:
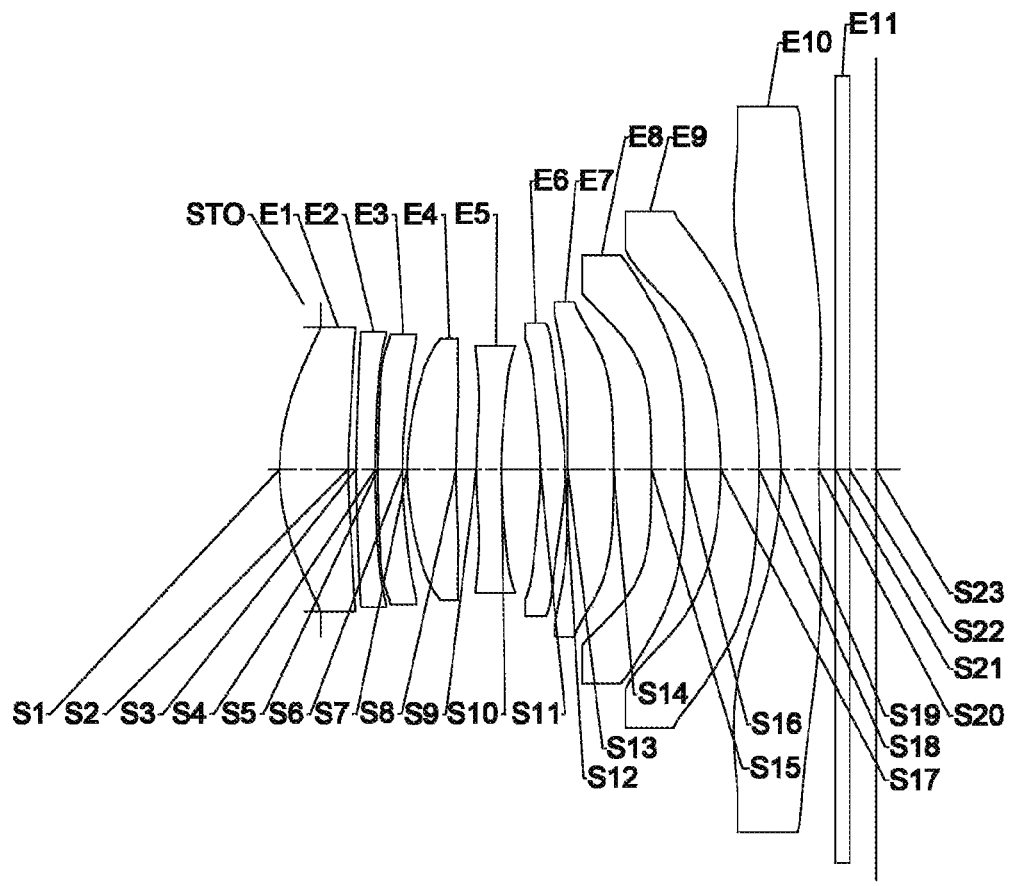
FIG. 7 illustrates a schematic structural view of a camera lens group according to example 4 of the present disclosure.

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is convex, and an image-side surface S14 thereof is convex. The eighth lens E8 has positive refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

In this example, a total effective focal length f of the camera lens group is 7.47 mm, a total length TTL of the camera lens group is 8.70 mm, half of a diagonal length ImgH of an effective pixel area on the imaging plane S23 of the camera lens group is 6.00 mm, half of a maximum field-of-view Semi-FOV of the camera lens group is 38.1°, and an aperture value Fno of the camera lens group is 1.80.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5997 | | | | |
| S1 | Aspheric | 3.2698 | 1.0000 | 1.55 | 56.1 | 8.85 | −0.4822 |
| S2 | Aspheric | 9.0325 | 0.1165 | | | | −99.0000 |
| S3 | Aspheric | 14.9327 | 0.2800 | 1.67 | 20.4 | 134.85 | −99.0000 |
| S4 | Aspheric | 17.7740 | 0.0362 | | | | 70.1646 |
| S5 | Aspheric | 31.3091 | 0.3600 | 1.67 | 20.4 | −15.27 | 99.0000 |
| S6 | Aspheric | 7.6442 | 0.0693 | | | | −48.0147 |
| S7 | Aspheric | 3.9909 | 0.7135 | 1.55 | 56.1 | 10.82 | 0.8990 |
| S8 | Aspheric | 11.5271 | 0.2964 | | | | 34.0460 |
| S9 | Aspheric | 7.0510 | 0.3600 | 1.67 | 20.4 | −89.68 | −17.5540 |
| S10 | Aspheric | 6.1782 | 0.5698 | | | | −42.3175 |
| S11 | Aspheric | −6.8067 | 0.3600 | 1.55 | 56.1 | 31.01 | −2.0699 |
| S12 | Aspheric | −4.9457 | 0.0400 | | | | 0.3828 |
| S13 | Aspheric | 200.0000 | 0.6692 | 1.68 | 19.2 | 33.43 | −99.0000 |
| S14 | Aspheric | −25.5066 | 0.5532 | | | | 46.2742 |
| S15 | Aspheric | −20.9016 | 0.4852 | 1.67 | 20.4 | 149.78 | −60.4736 |
| S16 | Aspheric | −17.4431 | 0.5266 | | | | 26.8490 |
| S17 | Aspheric | −5.0726 | 0.5600 | 1.62 | 23.5 | −23.98 | 0.2790 |
| S18 | Aspheric | −7.8770 | 0.3175 | | | | 1.1256 |
| S19 | Aspheric | −4.7857 | 0.5500 | 1.55 | 56.1 | −6.97 | −2.1134 |
| S20 | Aspheric | 19.3788 | 0.2404 | | | | 11.5550 |
| S21 | Spherical | Infinite | 0.2100 | 1.52 | 64.2 | | |
| S22 | Spherical | Infinite | 0.3863 | | | | |
| S23 | Spherical | Infinite | | | | | |

TABLE 8

| Surface number | A4 | A6 | A8 | A10 | A12 |
|---|---|---|---|---|---|
| S1 | −9.5371E−04 | −8.9049E−04 | 1.6332E−04 | −4.3862E−05 | −6.8055E−05 |
| S2 | 8.4457E−03 | −2.3950E−02 | 2.9644E−02 | −2.4375E−02 | 1.3025E−02 |
| S3 | −8.6664E−03 | −2.1698E−02 | 5.1175E−02 | −5.1308E−02 | 3.0410E−02 |
| S4 | 1.2421E−02 | −7.4393E−02 | 1.3824E−01 | −1.3829E−01 | 8.3768E−02 |
| S5 | 3.6607E−02 | −8.5396E−02 | 1.2210E−01 | −1.1188E−01 | 6.5274E−02 |
| S6 | 3.2626E−02 | −5.8269E−02 | 5.5489E−02 | −3.6781E−02 | 1.7438E−02 |
| S7 | 3.2661E−03 | −3.3748E−02 | −2.1324E−02 | 8.4837E−03 | |
| S8 | −1.7105E−02 | 1.2927E−04 | −3.0650E−03 | 2.7685E−03 | −1.6920E−03 |
| S9 | −2.7824E−02 | −4.8937E−04 | −5.7943E−03 | 9.0956E−03 | −6.1965E−03 |
| S10 | 3.4016E−03 | −1.2049E−02 | 6.0292E−03 | −2.0809E−03 | 1.8869E−03 |
| S11 | 7.0209E−03 | 9.9780E−03 | −3.7944E−03 | −4.8966E−03 | 5.3192E−03 |
| S12 | −8.5856E−03 | 4.3109E−02 | −3.1313E−02 | 9.5913E−03 | 3.7395E−04 |
| S13 | −1.8417E−02 | 1.7416E−02 | −1.5113E−02 | 6.1263E−03 | −1.1900E−03 |
| S14 | 5.5093E−04 | −2.0257E−02 | 1.6152E−02 | −9.0849E−03 | 3.3103E−03 |
| S15 | 7.2955E−03 | −3.4351E−02 | 1.8976E−02 | −6.5669E−03 | 1.4046E−03 |
| S16 | 1.8464E−02 | −3.1510E−02 | 1.5783E−02 | −4.5248E−03 | 8.1924E−04 |
| S17 | 2.2191E−02 | −1.9641E−02 | 6.6747E−03 | −9.2760E−04 | −4.0575E−05 |
| S18 | 2.6199E−02 | −1.4450E−02 | 4.0272E−03 | −7.0494E−04 | 7.4814E−05 |
| S19 | 1.9908E−02 | −9.1036E−03 | 2.0569E−03 | −2.6063E−04 | 2.0511E−05 |
| S20 | −2.8451E−03 | −1.4883E−03 | 3.9362E−04 | −4.5678E−05 | 2.9523E−06 |

| Surface number | A14 | A16 | A18 | A20 |
|---|---|---|---|---|
| S1 | 4.7216E−05 | −1.3402E−05 | 1.8762E−06 | −1.0474E−07 |
| S2 | −4.3913E−03 | 8.9434E−04 | −9.9806E−05 | 4.6653E−06 |
| S3 | −1.1176E−02 | 2.4796E−03 | −3.0264E−04 | 1.5560E−05 |
| S4 | −3.1647E−02 | 7.2960E−03 | −9.3750E−04 | 5.1284E−05 |
| S5 | −2.3970E−02 | 5.3941E−03 | −6.8022E−04 | 3.6692E−05 |
| S6 | −5.4978E−03 | 1.0926E−03 | −1.2645E−04 | 6.5688E−06 |
| S7 | −1.9264E−03 | 1.9365E−04 | 4.0904E−06 | −1.7890E−06 |
| S8 | 8.0817E−04 | −2.4196E−04 | 4.2491E−05 | −3.5991E−06 |
| S9 | 2.8337E−03 | −8.3222E−04 | 1.3658E−04 | −9.6736E−06 |

TABLE 8-continued

| | | | | |
|---|---|---|---|---|
| S10 | −1.1707E−03 | 4.0169E−04 | −7.3103E−05 | 5.4576E−06 |
| S11 | −2.3166E−03 | 5.1579E−04 | −5.6160E−05 | 2.2198E−06 |
| S12 | −1.1644E−03 | 3.4597E−04 | −4.4376E−05 | 2.1783E−06 |
| S13 | 7.1452E−05 | 1.3949E−05 | −2.8228E−06 | 1.4986E−07 |
| S14 | −7.6497E−04 | 1.0871E−04 | −8.5868E−06 | 2.8563E−07 |
| S15 | −1.7559E−04 | 1.1728E−05 | −3.1776E−07 | −4.7204E−10 |
| S16 | −9.6354E−05 | 7.2570E−06 | −3.2144E−07 | 6.3824E−09 |
| S17 | 2.8986E−05 | −3.6212E−06 | 1.9727E−07 | −4.1220E−09 |
| S18 | −4.3473E−06 | 9.9130E−08 | 1.4759E−09 | −7.9884E−11 |
| S19 | −1.0307E−06 | 3.2228E−08 | −5.7090E−10 | 4.3679E−12 |
| S20 | −1.0968E−07 | 2.2070E−09 | −1.9286E−11 | 1.6827E−14 |

Figure 8A:
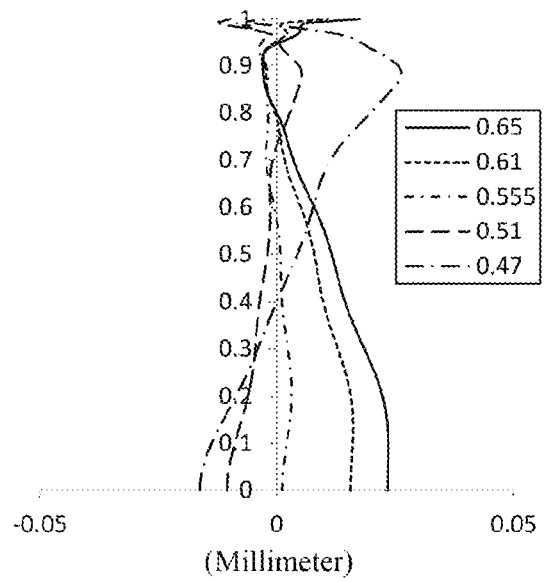
FIGS. 8A to 8D illustrate longitudinal aberration curves, astigmatic curves, a distortion curve, and a lateral color curve of the camera lens group of the example 4, respectively.
Figure 8B:
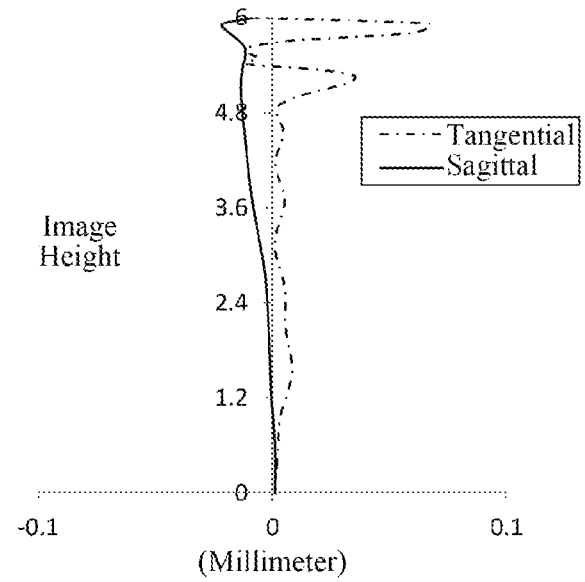
Figure 8C:
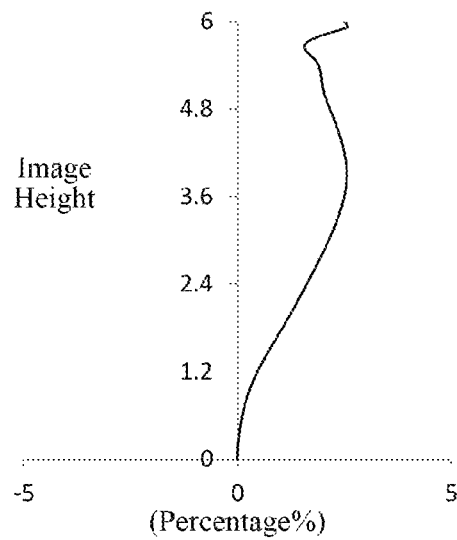
Figure 8D:
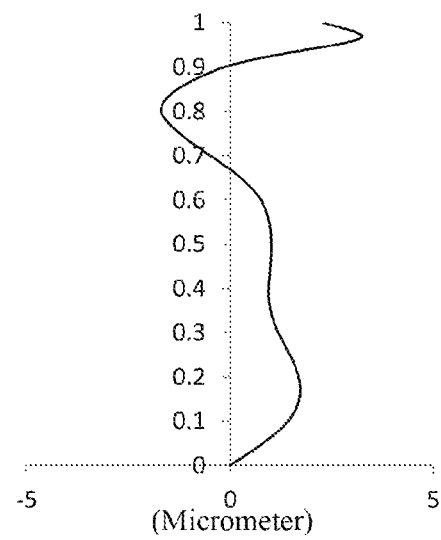

FIG. 8A illustrates longitudinal aberration curves of the camera lens group according to example 4, representing the deviations of focal points converged by light of different wavelengths after passing through the lens group. FIG. 8B illustrates astigmatic curves of the camera lens group according to example 4, representing the curvatures of a tangential plane and the curvatures of a sagittal plane. FIG. 8C illustrates a distortion curve of the camera lens group according to example 4, representing the amounts of distortion corresponding to different image heights. FIG. 8D illustrates a lateral color curve of the camera lens group according to example 4, representing the deviations of different image heights on an imaging plane after light passes through the lens group. It can be seen from FIG. 8A to FIG. 8D that the camera lens group provided in example 4 may achieve good image quality.

Example 5

Figure 9:
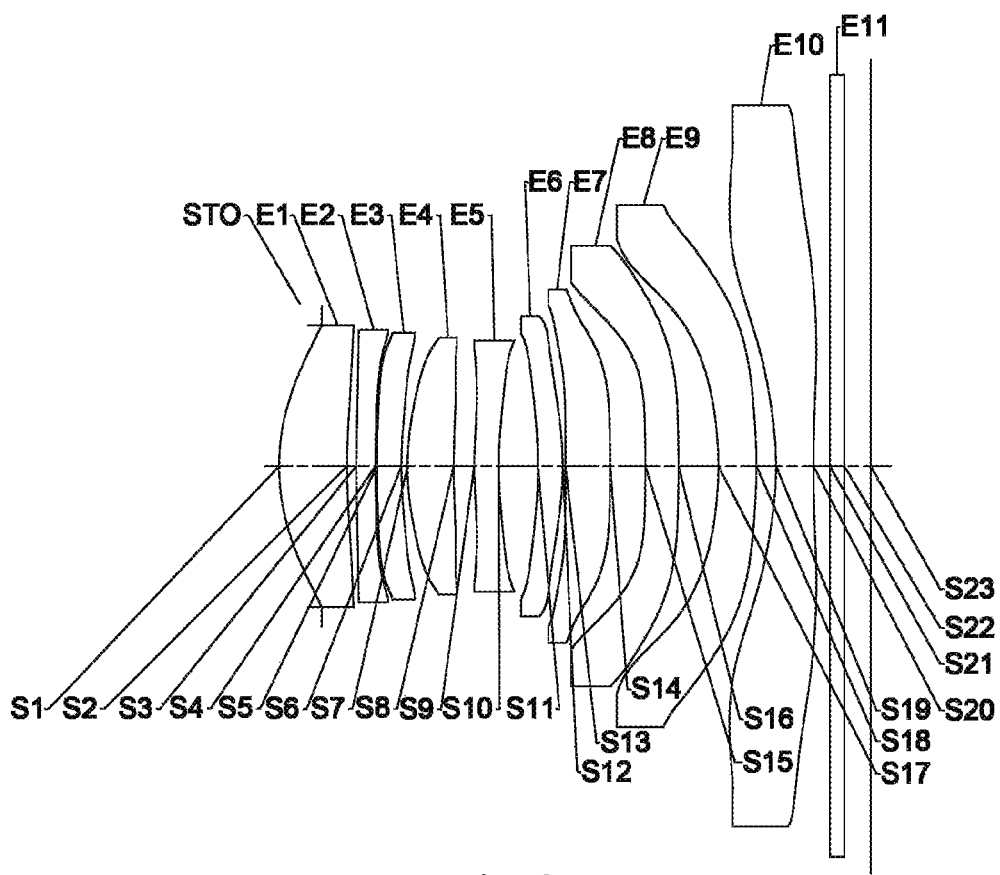
FIG. 9 illustrates a schematic structural view of a camera lens group according to example 5 of the present disclosure.

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is convex, and an image-side surface S14 thereof is convex. The eighth lens E8 has positive refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

In this example, a total effective focal length f of the camera lens group is 7.49 mm, a total length TTL of the camera lens group is 8.70 mm, half of a diagonal length ImgH of an effective pixel area on the imaging plane S23 of the camera lens group is 6.00 mm, half of a maximum field-of-view Semi-FOV of the camera lens group is 38.0°, and an aperture value Fno of the camera lens group is 1.80.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −0.6251 | | | | |
| S1 | Aspheric | 3.2333 | 1.0000 | 1.55 | 56.1 | 8.32 | −0.4229 |
| S2 | Aspheric | 9.9892 | 0.1352 | | | | −98.0758 |
| S3 | Aspheric | 17.5000 | 0.2800 | 1.67 | 20.4 | −215.58 | −99.0000 |
| S4 | Aspheric | 15.5000 | 0.0246 | | | | 56.7953 |
| S5 | Aspheric | 25.3396 | 0.3600 | 1.67 | 20.4 | −16.77 | 99.0000 |
| S6 | Aspheric | 7.7107 | 0.0882 | | | | −54.9244 |
| S7 | Aspheric | 4.0075 | 0.6799 | 1.55 | 56.1 | 11.05 | 0.8033 |
| S8 | Aspheric | 11.2310 | 0.3030 | | | | 32.7802 |
| S9 | Aspheric | 6.8597 | 0.3600 | 1.67 | 20.4 | −93.95 | −15.3174 |
| S10 | Aspheric | 6.0526 | 0.5774 | | | | −39.3202 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S11 | Aspheric | −6.7344 | 0.3637 | 1.55 | 56.1 | 31.64 | −1.3604 |
| S12 | Aspheric | −4.9379 | 0.0400 | | | | 0.6050 |
| S13 | Aspheric | 200.0000 | 0.6579 | 1.68 | 19.2 | 39.81 | −99.0000 |
| S14 | Aspheric | −31.1338 | 0.5180 | | | | 74.3373 |
| S15 | Aspheric | −24.7859 | 0.4878 | 1.67 | 20.4 | 87.09 | −99.0000 |
| S16 | Aspheric | −17.5055 | 0.5842 | | | | 26.2160 |
| S17 | Aspheric | −5.0565 | 0.5600 | 1.62 | 23.5 | −25.85 | 0.3388 |
| S18 | Aspheric | −7.5744 | 0.2885 | | | | 1.1978 |
| S19 | Aspheric | −4.6754 | 0.5500 | 1.55 | 56.1 | −6.83 | −2.2760 |
| S20 | Aspheric | 19.1239 | 0.2428 | | | | 11.4529 |
| S21 | Spherical | Infinite | 0.2100 | 1.52 | 64.2 | | |
| S22 | Spherical | Infinite | 0.3888 | | | | |
| S23 | Spherical | Infinite | | | | | |

TABLE 10

| Surface number | A4 | A6 | A8 | A10 | A12 |
|---|---|---|---|---|---|
| S1 | −8.2518E−04 | −4.1676E−04 | −4.5106E−04 | 4.7895E−04 | −3.3479E−04 |
| S2 | 6.7369E−03 | −1.8466E−02 | 2.1133E−02 | −1.6377E−02 | 8.4573E−03 |
| S3 | −8.7808E−03 | −2.1320E−02 | 4.4756E−02 | −4.1564E−02 | 2.3460E−02 |
| S4 | 1.5689E−02 | −8.9591E−02 | 1.5312E−01 | −1.4399E−01 | 8.3284E−02 |
| S5 | 3.7041E−02 | −8.8529E−02 | 1.2396E−01 | −1.1010E−01 | 6.2254E−02 |
| S6 | 1.9820E−02 | −2.3057E−02 | 6.9900E−03 | 4.1021E−03 | −5.0425E−03 |
| S7 | −1.0294E−02 | −4.3357E−03 | −3.2133E−03 | 8.9043E−03 | −7.3757E−03 |
| S8 | −1.7565E−02 | −1.3373E−03 | 1.7139E−03 | −3.8664E−03 | 3.7410E−03 |
| S9 | −2.7573E−02 | 2.5580E−04 | −5.7447E−03 | 8.6720E−03 | −6.0647E−03 |
| S10 | 3.3228E−03 | −1.1091E−02 | 5.8043E−03 | −2.5552E−03 | 2.3472E−03 |
| S11 | 6.8437E−03 | 8.5893E−03 | −2.3969E−03 | −5.8822E−03 | 5.8027E−03 |
| S12 | −8.3949E−03 | 4.2655E−02 | −3.1534E−02 | 9.6467E−03 | 4.0728E−04 |
| S13 | −2.0220E−02 | 1.8603E−02 | −1.5999E−02 | 6.5610E−03 | −1.3395E−03 |
| S14 | −1.8552E−03 | −2.0799E−02 | 1.6766E−02 | −9.3482E−03 | 3.3915E−03 |
| S15 | 1.1884E−02 | −3.5994E−02 | 1.8969E−02 | −6.5143E−03 | 1.4442E−03 |
| S16 | 2.4209E−02 | −3.1769E−02 | 1.4976E−02 | −4.1670E−03 | 7.3852E−04 |
| S17 | 2.2040E−02 | −1.9934E−02 | 6.8229E−03 | −9.6553E−04 | −3.6420E−05 |
| S18 | 2.7463E−02 | −1.6390E−02 | 4.8872E−03 | −9.0170E−04 | 1.0107E−04 |
| S19 | 2.2316E−02 | −9.4349E−03 | 2.0248E−03 | −2.4907E−04 | 1.9237E−05 |
| S20 | −3.0644E−03 | −8.9203E−04 | 2.0329E−04 | −1.7361E−05 | 5.1007E−07 |

| Surface number | A14 | A16 | A18 | A20 |
|---|---|---|---|---|
| S1 | 1.3207E−04 | −3.0005E−05 | 3.6950E−06 | −1.8992E−07 |
| S2 | −2.8134E−03 | 5.7350E−04 | −6.4663E−05 | 3.0728E−06 |
| S3 | −8.4100E−03 | 1.8521E−03 | −2.2691E−04 | 1.1788E−05 |
| S4 | −3.0225E−02 | 6.7159E−03 | −8.3483E−04 | 4.4347E−05 |
| S5 | −2.2041E−02 | 4.7566E−03 | −5.7409E−04 | 2.9666E−05 |
| S6 | 2.5868E−03 | −7.3403E−04 | 1.0801E−04 | −6.4304E−06 |
| S7 | 3.5480E−03 | −9.9559E−04 | 1.5047E−04 | −9.5512E−06 |
| S8 | −1.8566E−03 | 5.3636E−04 | −8.1702E−05 | 4.6132E−06 |
| S9 | 2.9102E−03 | −8.9964E−04 | 1.5561E−04 | −1.1666E−05 |
| S10 | −1.3979E−03 | 4.6767E−04 | −8.3679E−05 | 6.1738E−06 |
| S11 | −2.4509E−03 | 5.3502E−04 | −5.7261E−05 | 2.2240E−06 |
| S12 | −1.1614E−03 | 3.3855E−04 | −4.2695E−05 | 2.0635E−06 |
| S13 | 1.1142E−04 | 6.3405E−06 | −1.9787E−06 | 1.1069E−07 |
| S14 | −7.8167E−04 | 1.1076E−04 | −8.7215E−06 | 2.8923E−07 |
| S15 | −1.9707E−04 | 1.5703E−05 | −6.5129E−07 | 1.0332E−08 |
| S16 | −8.5233E−05 | 6.3033E−06 | −2.7424E−07 | 5.3502E−09 |
| S17 | 2.8975E−05 | −3.6571E−06 | 2.0009E−07 | −4.1908E−09 |
| S18 | −6.4525E−06 | 1.9800E−07 | −9.9001E−10 | −5.5384E−11 |
| S19 | −9.5371E−07 | 2.9474E−08 | −5.1590E−10 | 3.8938E−12 |
| S20 | 1.9284E−08 | −1.9015E−09 | 5.3178E−11 | −5.2634E−13 |

Figures 10A, 10B:
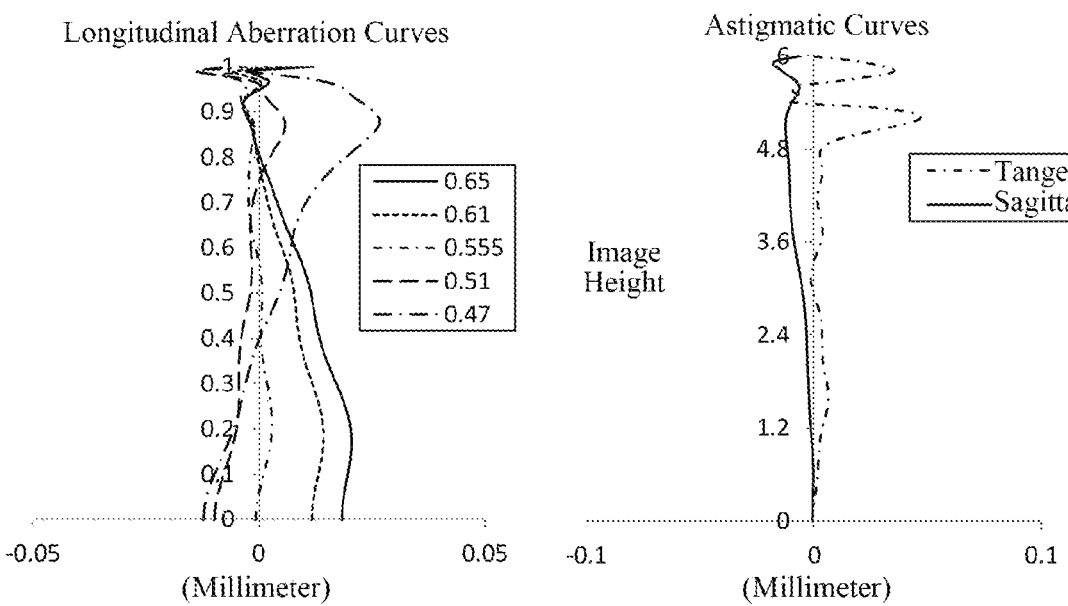

FIG. 10A illustrates longitudinal aberration curves of the camera lens group according to example 5, representing the deviations of focal points converged by light of different wavelengths after passing through the lens group. FIG. 10B illustrates astigmatic curves of the camera lens group according to example 5, representing the curvatures of a tangential plane and the curvatures of a sagittal plane. FIG. 10C illustrates a distortion curve of the camera lens group according to example 5, representing the amounts of distortion corresponding to different image heights. FIG. 10D illustrates a lateral color curve of the camera lens group according to example 5, representing the deviations of different image heights on an imaging plane after light passes through the lens group. It can be seen from FIG. 10A to FIG. 10D that the camera lens group provided in example 5 may achieve good image quality.

Example 6

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is concave, and an image-side surface S14 thereof is convex. The eighth lens E8 has positive refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

In this example, a total effective focal length f of the camera lens group is 7.49 mm, a total length TTL of the camera lens group is 8.70 mm, half of a diagonal length ImgH of an effective pixel area on the imaging plane S23 of the camera lens group is 6.00 mm, half of a maximum field-of-view Semi-FOV of the camera lens group is 38.0°, and an aperture value Fno of the camera lens group is 1.80.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.6276 | | | | |
| S1 | Aspheric | 3.2241 | 1.0000 | 1.55 | 56.1 | 8.34 | −0.4228 |
| S2 | Aspheric | 9.8352 | 0.1423 | | | | −99.0000 |
| S3 | Aspheric | 17.0000 | 0.2800 | 1.67 | 20.4 | −202.66 | −99.0000 |
| S4 | Aspheric | 15.0000 | 0.0231 | | | | 52.7508 |
| S5 | Aspheric | 23.1572 | 0.3600 | 1.67 | 20.4 | −17.28 | 99.0000 |
| S6 | Aspheric | 7.6423 | 0.0872 | | | | −54.3729 |
| S7 | Aspheric | 4.0223 | 0.6804 | 1.55 | 56.1 | 11.13 | 0.8709 |
| S8 | Aspheric | 11.1825 | 0.2935 | | | | 32.5712 |
| S9 | Aspheric | 6.9165 | 0.3600 | 1.67 | 20.4 | −118.80 | −15.1620 |
| S10 | Aspheric | 6.2284 | 0.5950 | | | | −38.9182 |
| S11 | Aspheric | −6.4511 | 0.3705 | 1.55 | 56.1 | 29.63 | −0.4918 |
| S12 | Aspheric | −4.7056 | 0.0400 | | | | 0.5702 |
| S13 | Aspheric | −150.0000 | 0.6591 | 1.68 | 19.2 | 48.47 | 52.1964 |
| S14 | Aspheric | −26.9918 | 0.4721 | | | | 68.4337 |
| S15 | Aspheric | −24.3724 | 0.4884 | 1.67 | 20.4 | 90.15 | −99.0000 |
| S16 | Aspheric | −17.4778 | 0.6122 | | | | 25.9027 |
| S17 | Aspheric | −5.0412 | 0.5600 | 1.62 | 23.5 | −27.09 | 0.3523 |
| S18 | Aspheric | −7.3957 | 0.2852 | | | | 1.1887 |
| S19 | Aspheric | −4.6077 | 0.5500 | 1.55 | 56.1 | −6.74 | −2.2506 |
| S20 | Aspheric | 19.0714 | 0.2425 | | | | 11.4339 |
| S21 | Spherical | Infinite | 0.2100 | 1.52 | 64.2 | | |
| S22 | Spherical | Infinite | 0.3884 | | | | |
| S23 | Spherical | Infinite | | | | | |

TABLE 12

| Surface number | A4 | A6 | A8 | A10 | A12 |
|---|---|---|---|---|---|
| S1 | −8.5635E−04 | −2.5494E−04 | −6.9191E−04 | 6.9524E−04 | −4.5076E−04 |
| S2 | 5.8343E−03 | −1.6940E−02 | 1.9188E−02 | −1.4209E−02 | 6.8110E−03 |

TABLE 12-continued

| S3 | −1.2030E−02 | −1.9261E−02 | 4.4627E−02 | −4.1793E−02 | 2.3215E−02 |
|---|---|---|---|---|---|
| S4 | 1.7657E−02 | −1.0538E−01 | 1.8348E−01 | −1.7415E−01 | 1.0094E−01 |
| S5 | 4.1361E−02 | −1.0509E−01 | 1.5208E−01 | −1.3728E−01 | 7.8183E−02 |
| S6 | 2.0254E−02 | −2.2884E−02 | 5.2608E−03 | 5.9573E−03 | −5.9805E−03 |
| S7 | −1.0459E−02 | −3.2961E−03 | −5.1781E−03 | 1.0499E−02 | −7.9874E−03 |
| S8 | −1.7728E−02 | −1.7236E−03 | 2.4202E−03 | −4.9335E−03 | 4.8004E−03 |
| S9 | −2.7036E−02 | −9.1401E−04 | −3.8588E−03 | 5.9496E−03 | −3.6058E−03 |
| S10 | 2.5185E−03 | −1.0239E−02 | 5.5582E−03 | −2.9791E−03 | 2.9474E−03 |
| S11 | 6.8119E−03 | 6.4364E−03 | 1.7087E−03 | −1.0322E−02 | 8.5421E−03 |
| S12 | −7.5883E−03 | 3.9393E−02 | −2.5348E−02 | 3.3793E−03 | 3.8891E−03 |
| S13 | −2.0131E−02 | 1.6935E−02 | −1.2671E−02 | 3.3981E−03 | 3.0950E−04 |
| S14 | −1.1914E−03 | −2.3992E−02 | 1.9645E−02 | −1.0881E−02 | 3.9147E−03 |
| S15 | 1.5345E−02 | −4.0921E−02 | 2.2582E−02 | −8.1967E−03 | 1.9759E−03 |
| S16 | 2.6510E−02 | −3.3936E−02 | 1.6209E−02 | −4.5351E−03 | 7.9861E−04 |
| S17 | 2.4100E−02 | −2.2513E−02 | 7.8328E−03 | −1.1171E−03 | −3.7562E−05 |
| S18 | 3.0345E−02 | −1.9237E−02 | 5.9732E−03 | −1.1230E−03 | 1.2802E−04 |
| S19 | 2.2683E−02 | −9.6900E−03 | 2.1007E−03 | −2.6178E−04 | 2.0523E−05 |
| S20 | −4.0459E−03 | −3.0945E−04 | 6.2195E−05 | 1.1604E−06 | −9.5841E−07 |

| Surface number | A14 | A16 | A18 | A20 |
|---|---|---|---|---|
| S1 | 1.6975E−04 | −3.7366E−05 | 4.4873E−06 | −2.2579E−07 |
| S2 | −2.0605E−03 | 3.7349E−04 | −3.6086E−05 | 1.3691E−06 |
| S3 | −8.1070E−03 | 1.7331E−03 | −2.0586E−04 | 1.0349E−05 |
| S4 | −3.6450E−02 | 8.0107E−03 | −9.8121E−04 | 5.1289E−05 |
| S5 | −2.7712E−02 | 5.9493E−03 | −7.1021E−04 | 3.6164E−05 |
| S6 | 2.8580E−03 | −7.8136E−04 | 1.1291E−04 | −6.6739E−06 |
| S7 | 3.6641E−03 | −1.0046E−03 | 1.5016E−04 | −9.4719E−06 |
| S8 | −2.4212E−03 | 7.0461E−04 | −1.0891E−04 | 6.4755E−06 |
| S9 | 1.6631E−03 | −5.4895E−04 | 1.0400E−04 | −8.5589E−06 |
| S10 | −1.7053E−03 | 5.4179E−04 | −9.1906E−05 | 6.4938E−06 |
| S11 | −3.4378E−03 | 7.4245E−04 | −8.0867E−05 | 3.3436E−06 |
| S12 | −2.2749E−03 | 5.4441E−04 | −6.3194E−05 | 2.9154E−06 |
| S13 | −3.8131E−04 | 9.0650E−05 | −9.6716E−06 | 4.0103E−07 |
| S14 | −8.9233E−04 | 1.2461E−04 | −9.6581E−06 | 3.1555E−07 |
| S15 | −3.0790E−04 | 2.9943E−05 | −1.6603E−06 | 4.0324E−08 |
| S16 | −9.0613E−05 | 6.5358E−06 | −2.7612E−07 | 5.2286E−09 |
| S17 | 3.2032E−05 | −4.0278E−06 | 2.1862E−07 | −4.5357E−09 |
| S18 | −8.4847E−06 | 2.9125E−07 | −3.3706E−09 | −2.9609E−11 |
| S19 | −1.0335E−06 | 3.2425E−08 | −5.7564E−10 | 4.4015E−12 |
| S20 | 9.2064E−08 | −4.1109E−09 | 9.0731E−11 | −7.9966E−13 |

Figure 12A:
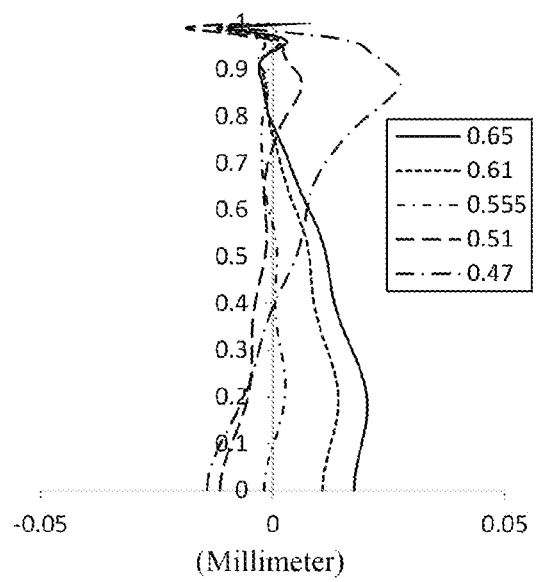
FIGS. 12A to 12D illustrate longitudinal aberration curves, astigmatic curves, a distortion curve, and a lateral color curve of the camera lens group of the example 6, respectively.
Figure 12B:
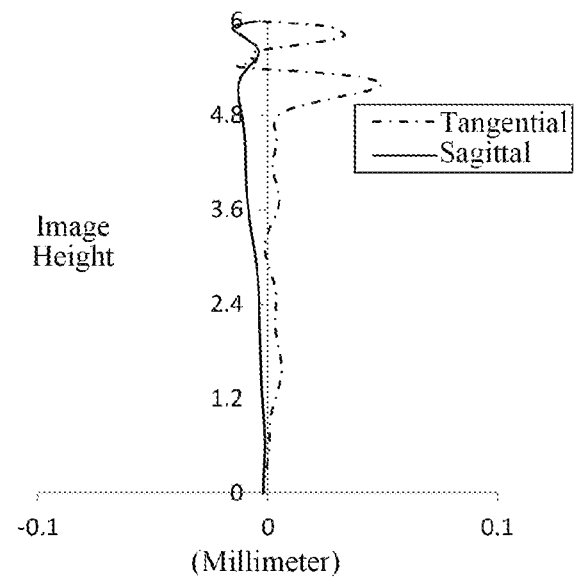
Figure 12C:
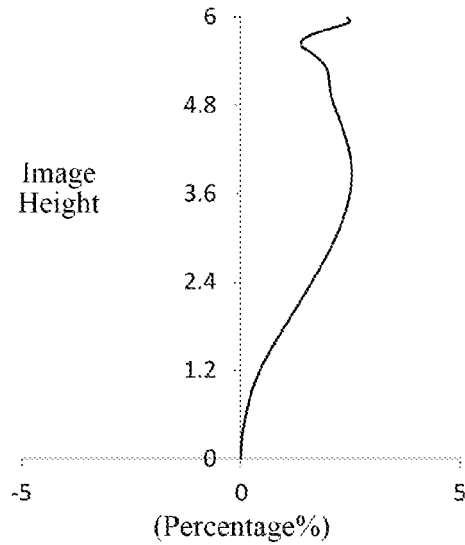
Figure 12D:
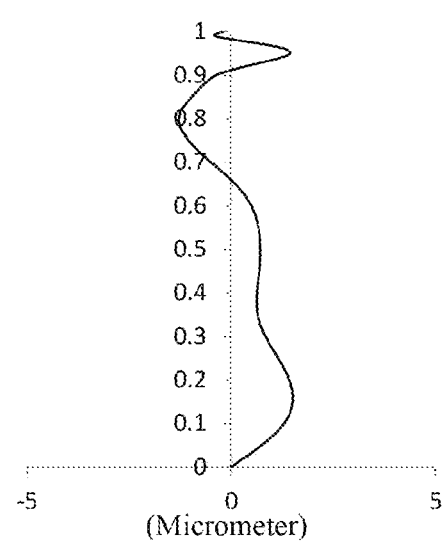

FIG. 12A illustrates longitudinal aberration curves of the camera lens group according to example 6, representing the deviations of focal points converged by light of different wavelengths after passing through the lens group. FIG. 12B illustrates astigmatic curves of the camera lens group according to example 6, representing the curvatures of a tangential plane and the curvatures of a sagittal plane. FIG. 12C illustrates a distortion curve of the camera lens group according to example 6, representing the amounts of distortion corresponding to different image heights. FIG. 12D illustrates a lateral color curve of the camera lens group according to example 6, representing the deviations of different image heights on an imaging plane after light passes through the lens group. It can be seen from FIG. 12A to FIG. 12D that the camera lens group provided in example 6 may achieve good image quality.

Example 7

Figure 13:
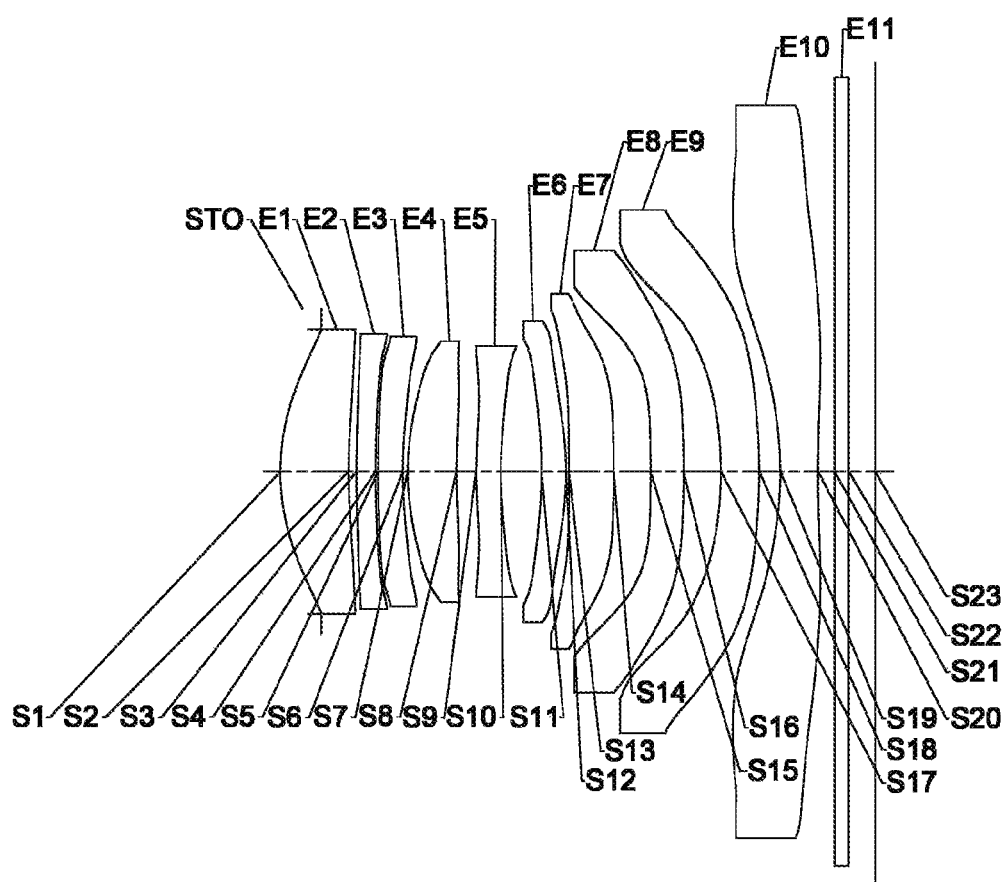
FIG. 13 illustrates a schematic structural view of a camera lens group according to example 7 of the present disclosure.

A camera lens group according to example 7 of the present disclosure is described below with reference to FIG. 13 to FIG. 14D. FIG. 13 shows a schematic structural view of the camera lens group according to example 7 of the present disclosure.

As shown in FIG. 13, the camera lens group includes a stop STO, a first lens E1, a second lens E2, a third lens E3, a fourth lens E4, a fifth lens E5, a sixth lens E6, a seventh lens E7, an eighth lens E8, a ninth lens E9, a tenth lens E10, an optical filter E11 and an imaging plane S23, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is concave, and an image-side surface S12 thereof is convex. The seventh lens E7 has positive refractive power, an object-side surface S13 thereof is concave, and an image-side surface S14 thereof is convex. The eighth lens E8 has positive refractive power, an object-side surface S15 thereof is concave, and an image-side surface S16 thereof is convex. The ninth lens E9 has negative refractive power, an object-side surface S17 thereof is concave, and an image-side surface S18 thereof is convex. The tenth lens E10 has negative refractive power, an object-side surface S19 thereof is concave, and an image-side surface S20 thereof is concave. The optical filter E11 has an object-side surface S21 and an image-side surface S22. Light from an object sequentially passes through the respective surfaces S1 to S22 and is finally imaged on the imaging plane S23.

In this example, a total effective focal length f of the camera lens group is 7.49 mm, a total length TTL of the camera lens group is 8.70 mm, half of a diagonal length ImgH of an effective pixel area on the imaging plane S23 of the camera lens group is 6.00 mm, half of a maximum field-of-view Semi-FOV of the camera lens group is 38.0°, and an aperture value Fno of the camera lens group is 1.80.

Table 13 is a table illustrating basic parameters of the camera lens group of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6034 | | | | |
| S1 | Aspheric | 3.2631 | 1.0000 | 1.55 | 56.1 | 8.83 | −0.4822 |
| S2 | Aspheric | 9.0128 | 0.1135 | | | | −99.0000 |
| S3 | Aspheric | 14.8496 | 0.2800 | 1.67 | 20.4 | 144.54 | −99.0000 |
| S4 | Aspheric | 17.4235 | 0.0388 | | | | 70.6527 |
| S5 | Aspheric | 30.8690 | 0.3600 | 1.67 | 20.4 | −15.62 | 99.0000 |
| S6 | Aspheric | 7.7468 | 0.0723 | | | | −49.8694 |
| S7 | Aspheric | 4.0182 | 0.7141 | 1.55 | 56.1 | 10.95 | 0.9671 |
| S8 | Aspheric | 11.4947 | 0.2866 | | | | 33.8450 |
| S9 | Aspheric | 6.9303 | 0.3600 | 1.67 | 20.4 | −103.94 | −15.8925 |
| S10 | Aspheric | 6.1692 | 0.5954 | | | | −39.4099 |
| S11 | Aspheric | −6.6552 | 0.3602 | 1.55 | 56.1 | 27.91 | −0.6610 |
| S12 | Aspheric | −4.7206 | 0.0400 | | | | 0.3129 |
| S13 | Aspheric | −150.0000 | 0.6555 | 1.68 | 19.2 | 43.74 | −99.0000 |
| S14 | Aspheric | −24.7920 | 0.5406 | | | | 43.6785 |
| S15 | Aspheric | −21.2313 | 0.4800 | 1.67 | 20.4 | 122.44 | −58.2906 |
| S16 | Aspheric | −17.0000 | 0.5479 | | | | 25.2741 |
| S17 | Aspheric | −4.9619 | 0.5600 | 1.62 | 23.5 | −24.47 | 0.2693 |
| S18 | Aspheric | −7.5600 | 0.3102 | | | | 1.2378 |
| S19 | Aspheric | −4.7390 | 0.5500 | 1.55 | 56.1 | −6.92 | −2.1222 |
| S20 | Aspheric | 19.3909 | 0.2395 | | | | 11.5597 |
| S21 | Spherical | Infinite | 0.2100 | 1.52 | 64.2 | | |
| S22 | Spherical | Infinite | 0.3854 | | | | |
| S23 | Spherical | Infinite | | | | | |

TABLE 14

| Surface number | A4 | A6 | A8 | A10 | A12 |
|---|---|---|---|---|---|
| S1 | −9.6415E−04 | −7.0863E−04 | −9.9558E−05 | 1.9543E−04 | −2.0148E−04 |
| S2 | 7.6803E−03 | −2.2881E−02 | 2.8180E−02 | −2.2740E−02 | 1.1842E−02 |
| S3 | −9.9383E−03 | −1.8812E−02 | 4.6153E−02 | −4.5944E−02 | 2.6921E−02 |
| S4 | 9.8144E−03 | −6.0146E−02 | 1.0875E−01 | −1.0695E−01 | 6.4554E−02 |
| S5 | 3.3950E−02 | −7.1172E−02 | 9.2597E−02 | −8.0288E−02 | 4.5770E−02 |
| S6 | 3.1533E−02 | −5.3534E−02 | 4.5775E−02 | −2.5963E−02 | 1.0208E−02 |
| S7 | 3.2362E−03 | −3.0686E−02 | 2.8163E−02 | −1.4815E−02 | 4.4238E−03 |
| S8 | −1.6750E−02 | −1.7687E−04 | −2.7933E−03 | 2.2740E−03 | −1.1850E−03 |
| S9 | −2.7418E−02 | −5.0788E−04 | −5.5113E−03 | 8.4661E−03 | −5.5912E−03 |
| S10 | 2.5563E−03 | −1.0430E−02 | 4.6714E−03 | −1.2955E−03 | 1.5835E−03 |
| S11 | 5.4852E−03 | 1.0639E−02 | −2.2621E−03 | −7.8806E−03 | 7.4649E−03 |
| S12 | −1.0490E−02 | 4.7124E−02 | −3.1968E−02 | 7.0361E−03 | 2.5135E−03 |
| S13 | −1.8889E−02 | 1.8552E−02 | −1.4481E−02 | 4.4850E−03 | −1.3659E−04 |
| S14 | 1.2913E−03 | −2.3302E−02 | 1.9055E−02 | −1.0660E−02 | 3.8399E−03 |
| S15 | 9.4989E−03 | −3.6738E−02 | 2.0155E−02 | −7.0578E−03 | 1.5881E−03 |
| S16 | 1.7708E−02 | −2.9988E−02 | 1.4480E−02 | −3.9496E−03 | 6.7362E−04 |
| S17 | 1.6611E−02 | −1.3875E−02 | 3.9121E−03 | −1.2824E−04 | −1.8917E−04 |
| S18 | 2.2055E−02 | −1.1269E−02 | 2.8313E−03 | −4.2177E−04 | 3.0414E−05 |
| S19 | 1.8626E−02 | −8.7096E−03 | 2.0133E−03 | −2.5986E−04 | 2.0791E−05 |
| S20 | −3.5780E−03 | −1.1662E−03 | 3.2392E−04 | −3.6571E−05 | 2.2089E−06 |

| Surface number | A14 | A16 | A18 | A20 |
|---|---|---|---|---|
| S1 | 9.2655E−05 | −2.2758E−05 | 2.9443E−06 | −1.5666E−07 |
| S2 | −3.8689E−03 | 7.5696E−04 | −7.9913E−05 | 3.4372E−06 |
| S3 | −9.7741E−03 | 2.1391E−03 | −2.5665E−04 | 1.2891E−05 |
| S4 | −2.4544E−02 | 5.7245E−03 | −7.4460E−04 | 4.1106E−05 |
| S5 | −1.6727E−02 | 3.7904E−03 | −4.8440E−04 | 2.6505E−05 |
| S6 | −2.5180E−03 | 3.5198E−04 | −2.4875E−05 | 6.7960E−07 |
| S7 | −3.3325E−04 | −1.8839E−04 | 5.4917E−05 | −4.6514E−06 |

TABLE 14-continued

| | | | | |
|---|---|---|---|---|
| S8 | 5.4760E−04 | −1.6711E−04 | 3.0652E−05 | −2.7940E−06 |
| S9 | 2.5498E−03 | −7.6587E−04 | 1.2952E−04 | −9.4403E−06 |
| S10 | −1.0692E−03 | 3.6967E−04 | −6.6718E−05 | 4.9460E−06 |
| S11 | −3.1301E−03 | 6.9011E−04 | −7.6189E−05 | 3.1752E−06 |
| S12 | −1.9483E−03 | 4.9968E−04 | −6.0160E−05 | 2.8475E−06 |
| S13 | −2.6391E−04 | 7.2328E−05 | −8.1482E−06 | 3.4940E−07 |
| S14 | −8.7483E−04 | 1.2237E−04 | −9.5228E−06 | 3.1287E−07 |
| S15 | −2.2214E−04 | 1.8609E−05 | −8.5177E−07 | 1.6368E−08 |
| S16 | −7.4189E−05 | 5.2453E−06 | −2.2090E−07 | 4.2506E−09 |
| S17 | 4.6568E−05 | −4.8901E−06 | 2.4809E−07 | −4.9888E−09 |
| S18 | 1.8157E−07 | −1.8692E−07 | 1.1574E−08 | −2.3152E−10 |
| S19 | −1.0605E−06 | 3.3602E−08 | −6.0234E−10 | 4.6587E−12 |
| S20 | −7.1646E−08 | 1.0259E−09 | 1.0066E−12 | −1.3059E−13 |

Figure 14A:
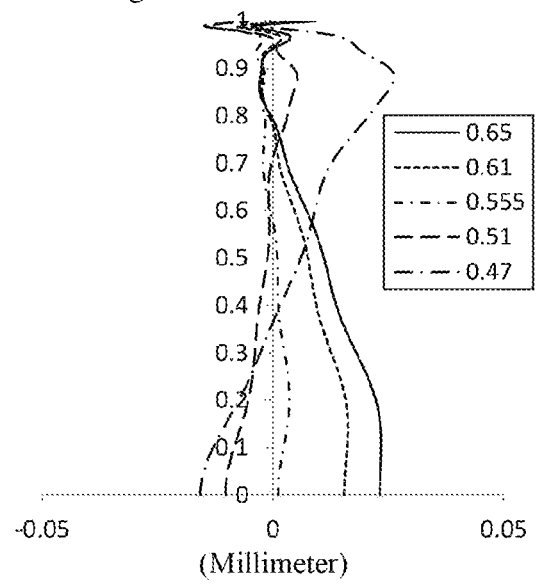
FIGS. 14A to 14D illustrate longitudinal aberration curves, astigmatic curves, a distortion curve, and a lateral color curve of the camera lens group of the example 7, respectively.
Figure 14B:
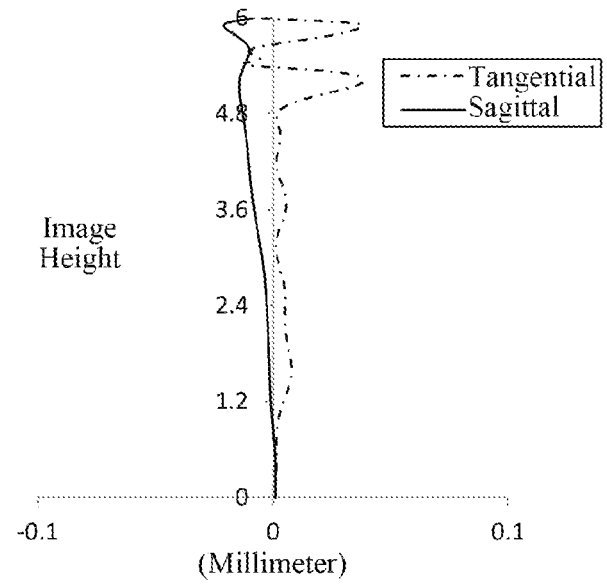
Figure 14C:
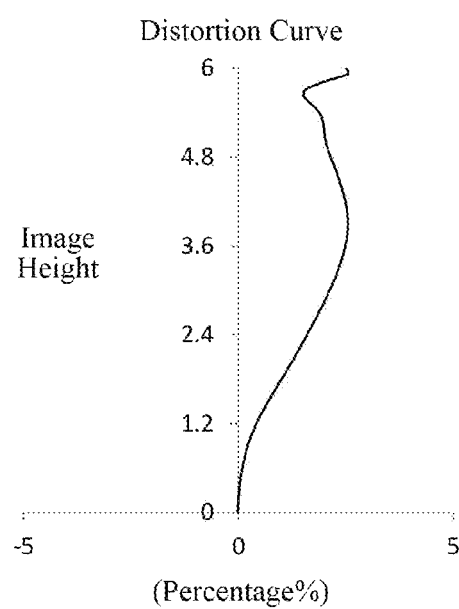
Figure 14D:
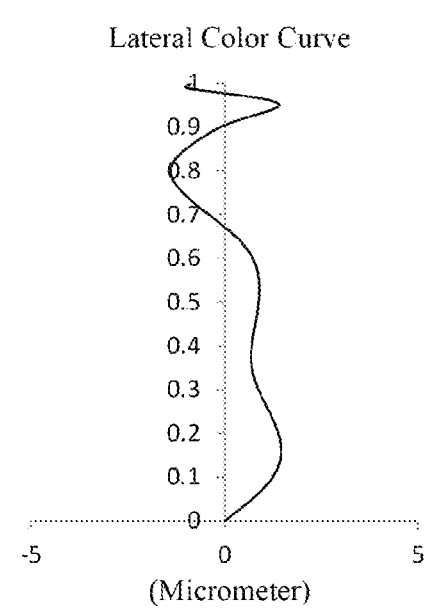

FIG. 14A illustrates longitudinal aberration curves of the camera lens group according to example 7, representing the deviations of focal points converged by light of different wavelengths after passing through the lens group. FIG. 14B illustrates astigmatic curves of the camera lens group according to example 7, representing the curvatures of a tangential plane and the curvatures of a sagittal plane. FIG. 14C illustrates a distortion curve of the camera lens group according to example 7, representing the amounts of distortion corresponding to different image heights. FIG. 14D illustrates a lateral color curve of the camera lens group according to example 7, representing the deviations of different image heights on an imaging plane after light passes through the lens group. It can be seen from FIG. 14A to FIG. 14D that the camera lens group provided in example 7 may achieve good image quality.

In view of the above, examples 1 to 7 respectively satisfy the relationship shown in Table 15.

TABLE 15

| | Example | | | | | | |
|---|---|---|---|---|---|---|---|
| Condition | 1 | 2 | 3 | 4 | 5 | 6 | 7 |
| f9/R19 | 3.20 | 4.80 | 4.99 | 5.01 | 5.53 | 5.88 | 5.16 |
| TTL/ImgH | 1.45 | 1.45 | 1.45 | 1.45 | 1.45 | 1.45 | 1.45 |
| (R17 + R18)/(R18 − R17) | 3.79 | 4.51 | 4.60 | 4.62 | 5.02 | 5.28 | 4.82 |
| (T910 + CT10)/(CT10 − T910) | 3.26 | 3.63 | 3.78 | 3.73 | 3.21 | 3.15 | 3.59 |
| (f6 + R20)/(f6 − R20) | 3.07 | 4.13 | 4.56 | 4.33 | 4.06 | 4.61 | 5.55 |
| (SAG91 + SAG92)/(SAG91 − SAG92) | 18.91 | 23.34 | 18.79 | 19.12 | 22.67 | 27.45 | 27.47 |
| (DT101 + DT102)/(DT102 − DT101) | 30.55 | 22.47 | 20.42 | 20.54 | 21.27 | 20.16 | 20.35 |
| (DT91 + DT92)/(DT92 − DT91) | 11.36 | 12.87 | 12.39 | 12.46 | 14.25 | 14.52 | 14.42 |
| (ET8 + ET10)/(ET10 − ET8) | 9.70 | 6.40 | 4.57 | 4.66 | 5.86 | 5.35 | 4.93 |
| f89/f910 | 3.06 | 4.33 | 5.35 | 5.46 | 7.02 | 7.39 | 5.86 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, comprising: a first lens, a second lens, a third lens, a fourth lens, a fifth lens, a sixth lens, a seventh lens, an eighth lens, a ninth lens and a tenth lens which are sequentially arranged from an object side to an image side of the camera lens group along an optical axis, wherein each of the first lens to the tenth lens has refractive power, and $ImgH \geq 6.00$ mm, where ImgH is half of a diagonal length of an effective pixel area on an imaging plane of the camera lens group.

2. The camera lens group according to claim 1, wherein $3.00 < (R17+R18)/(R18-R17) < 6.00$, where R17 is a radius of curvature of an object-side surface of the ninth lens, and R18 is a radius of curvature of an image-side surface of the ninth lens.

3. The camera lens group according to claim 2, wherein $3.00 < (T910+CT10)/(CT10-T910) < 4.00$, where T910 is a spaced interval between the ninth lens and the tenth lens along the optical axis, and CT10 is a center thickness of the tenth lens along the optical axis.

4. The camera lens group according to claim 1, wherein $3.00 < (f6+R20)/(f6-R20) < 6.00$, where f6 is an effective focal length of the sixth lens, and R20 is a radius of curvature of an image-side surface of the tenth lens.

5. The camera lens group according to claim 2, wherein $18.00 < (SAG91+SAG92)/(SAG91-SAG92) < 28.00$, where SAG91 is a distance along the optical axis from an intersection of the object-side surface of the ninth lens and the optical axis to a vertex of an effective radius of the object-side surface of the ninth lens, and SAG92 is a distance along the optical axis from an intersection of the image-side surface of the ninth lens and the optical axis to a vertex of an effective radius of the image-side surface of the ninth lens.

6. The camera lens group according to claim 2, wherein 20.00<(DT101+DT102)/(DT102−DT101)<31.00,
where DT101 is a maximum effective radius of an object-side surface of the tenth lens, and DT102 is a maximum effective radius of an image-side surface of the tenth lens.

7. The camera lens group according to claim 2, wherein 11.00<(DT91+DT92)/(DT92−DT91)<15.00,
where DT91 is a maximum effective radius of the object-side surface of the ninth lens, and DT92 is a maximum effective radius of the image-side surface of the ninth lens.

8. The camera lens group according to claim 1, wherein 4.00<(ET8+ET10)/(ET10−ET8)<10.00,
where ET8 is an edge thickness of the eighth lens, and ET10 is an edge thickness of the tenth lens.

9. The camera lens group according to claim 8, wherein 3.00<f89/f910<8.00,
where f89 is a combined focal length of the eighth lens and the ninth lens, and f910 is a combined focal length of the ninth lens and the tenth lens.

10. The camera lens group according to claim 2, wherein 3.00<f9/R19<6.00,
where f9 is an effective focal length of the ninth lens, and R19 is a radius of curvature of an object-side surface of the tenth lens.

11. The camera lens group according to claim 1, wherein TTL/ImgH≤1.45,
where TTL is a distance along the optical axis from an object-side surface of the first lens to the imaging plane of the camera lens group, and ImgH is half of the diagonal length of the effective pixel area on the imaging plane of the camera lens group.

12. A camera lens group, comprising: a first lens, a second lens, a third lens, a fourth lens, a fifth lens, a sixth lens, a seventh lens, an eighth lens, a ninth lens and a tenth lens which are sequentially arranged from an object side to an image side of the camera lens group along an optical axis,
wherein each of the first lens to the tenth lens has refractive power,
an object-side surface of the first lens is convex, and
ImgH≥6.00 mm, where ImgH is half of a diagonal length of an effective pixel area on an imaging plane of the camera lens group.

13. The camera lens group according to claim 12, wherein 3.00<(f6+R20)/(f6−R20)<6.00,
where f6 is an effective focal length of the sixth lens, and R20 is a radius of curvature of an image-side surface of the tenth lens.

14. The camera lens group according to claim 12, wherein 3.00<f89/f910<8.00,
where f89 is a combined focal length of the eighth lens and the ninth lens, and f910 is a combined focal length of the ninth lens and the tenth lens.

15. The camera lens group according to claim 12, wherein 4.00<(ET8+ET10)/(ET10−ET8)<10.00,
where ET8 is an edge thickness of the eighth lens, and ET10 is an edge thickness of the tenth lens.

16. The camera lens group according to claim 12, wherein 3.00<(T910+CT10)/(CT10−T910)<4.00,
where T910 is a spaced interval between the ninth lens and the tenth lens along the optical axis, and CT10 is a center thickness of the tenth lens along the optical axis.

17. The camera lens group according to claim 12, wherein the first lens has positive refractive power.

18. The camera lens group according to claim 12, wherein the seventh lens has positive refractive power, and an image-side surface of the seventh lens is convex.

19. The camera lens group according to claim 12, wherein an object-side surface of the tenth lens is concave, and an image-side surface of the tenth lens is concave.

* * * * *